US012771669B2

(12) United States Patent
Mestery et al.

(10) Patent No.: US 12,771,669 B2
(45) Date of Patent: Oct. 20, 2026

(54) USING DPU DEVICES AND EBPF PROGRAMS TO ADD METADATA FOR SECURITY AND OBSERVABILITY

(71) Applicant: Cisco Technology, Inc., San Jose, CA (US)

(72) Inventors: Kyle Andrew Donald Mestery, Woodbury, MN (US); Vincent Parla, North Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 102 days.

(21) Appl. No.: 18/623,550

(22) Filed: Apr. 1, 2024

(65) Prior Publication Data

US 2025/0039133 A1 Jan. 30, 2025

Related U.S. Application Data

(60) Provisional application No. 63/516,448, filed on Jul. 28, 2023.

(51) Int. Cl.
*H04L 9/40* (2022.01)
*H04L 9/32* (2006.01)
(Continued)

(52) U.S. Cl.
CPC ........ *H04L 63/0236* (2013.01); *H04L 9/3247* (2013.01); *H04L 41/0806* (2013.01); (Continued)

(58) Field of Classification Search
CPC ............. H04L 63/0218; H04L 63/0227–0263; H04L 63/1425; H04L 63/1441–1466; H04L 63/166; H04L 63/20
See application file for complete search history.

(56) References Cited

U.S. PATENT DOCUMENTS

| | | | |
|---|---|---|---|
| 2012/0166637 A1* | 6/2012 | White, Jr. | H04L 63/1425 709/224 |
| 2015/0009995 A1 | 1/2015 | Gross, IV et al. | |

(Continued)

FOREIGN PATENT DOCUMENTS

| | | | |
|---|---|---|---|
| CN | 114168969 | A | 3/2022 |
| WO | 2022257643 | A1 | 12/2022 |
| WO | 2023056812 | A1 | 4/2023 |
| WO | 2023121868 | A1 | 6/2023 |

OTHER PUBLICATIONS

International Search Report and Written Opinion for International Application No. PCT/US2024/040070, mailed Sep. 25, 2024, 14 Pages.

*Primary Examiner* — Kevin Bechtel
(74) *Attorney, Agent, or Firm* — Polsinelli P.C.

(57) ABSTRACT

A system and method are provided for adding in-band metadata with a data flow. The in-band metadata can be based on observations by an extended Berkley packet filter (eBPF) of an application running in a datacenter, for example. A processor executes the application to generate data that is encoded in the payloads of packets in a data flow to be transmitted via a network to a destination. The eBPF is also executed on the processor and generates observations of the application (e.g., OSI layer 7 observations). Metadata is generated based on the observations and encoded into headers of the packets of the data flow. The metadata can then be used at the destination to determine the next processing steps for the data flow (e.g., is the data flow trusted and allowed into another workload).

20 Claims, 14 Drawing Sheets

(51) Int. Cl.

| | |
|---|---|
| ***H04L 41/0806*** | (2022.01) |
| ***H04L 41/0816*** | (2022.01) |
| ***H04L 41/082*** | (2022.01) |
| ***H04L 41/0869*** | (2022.01) |
| ***H04L 41/0895*** | (2022.01) |
| ***H04L 43/50*** | (2022.01) |
| ***H04L 45/24*** | (2022.01) |
| ***H04L 45/80*** | (2022.01) |

(52) U.S. Cl.

CPC ........ *H04L 41/0816* (2013.01); *H04L 41/082* (2013.01); *H04L 41/0869* (2013.01); *H04L 41/0895* (2022.05); *H04L 43/50* (2013.01); *H04L 45/24* (2013.01); *H04L 45/80* (2022.05); *H04L 63/0218* (2013.01); *H04L 63/0263* (2013.01); *H04L 63/0435* (2013.01); *H04L 63/123* (2013.01); *H04L 63/1425* (2013.01); *H04L 63/1433* (2013.01); *H04L 63/145* (2013.01); *H04L 63/166* (2013.01); *H04L 63/20* (2013.01)

(56) References Cited

U.S. PATENT DOCUMENTS

| | | | |
|---|---|---|---|
| 2019/0324882 | A1* | 10/2019 | Borello ................. G06F 9/5077 |
| 2019/0394165 | A1* | 12/2019 | Miller ................. H04L 12/4645 |
| 2021/0144075 | A1 | 5/2021 | Indiresan et al. |
| 2023/0097734 | A1 | 3/2023 | Parla et al. |
| 2023/0188561 | A1 | 6/2023 | Finkelshtien et al. |
| 2023/0198964 | A1 | 6/2023 | Viswambharan et al. |
| 2023/0216829 | A1* | 7/2023 | Jain ......................... H04L 63/20 726/1 |
| 2023/0291769 | A1 | 9/2023 | Talur et al. |

* cited by examiner

| Order | Header Type | Next Header Code |
|---|---|---|
| 1 | Basic IPv6 Header | - |
| 2 | Hop-by-Hop Options | 0 |
| 3 | Destination Options (with Routing Options) | 60 |
| 4 | Routing Header | 43 |
| 5 | Fragment Header | 44 |
| 6 | Authentication Header | 51 |
| 7 | Encapsulation Security Payload Header | 50 |
| 8 | Destination Options | 60 |
| 9 | Mobility Header | 135 |
| | No next header | 59 |
| Upper Layer | TCP | 6 |
| Upper Layer | UDP | 17 |
| Upper Layer | ICMPv6 | 58 |

FIG. 9C

USING DPU DEVICES AND EBPF PROGRAMS TO ADD METADATA FOR SECURITY AND OBSERVABILITY

CROSS-REFERENCE TO RELATED APPLICATIONS

This application priority to U.S. provisional application No. 63/516,448, titled "Data Processing Units (DPUs) and extended Berkley Packet Filters (eBPFs) for Improved Security," and filed on Jul. 28, 2023, which is expressly incorporated by reference herein in its entirety.

TECHNICAL FIELD

The subject matter of this disclosure relates in general to the field of encoding application observations in in-band metadata, and, more specifically, aspects relate to using extended Berkley packet filters (eBPFs) to observe an application and generate contextual metadata for data flows generated by the application.

BACKGROUND

Network and application telemetry provide network monitoring technology used to remotely collect data from devices at high speed. Devices periodically push device information to a collector, providing real-time, high-speed, and accurate network monitoring. For example, telemetry can organize data (e.g., based on a YANG model) and encode the data (e.g., in the Google Protocol Buffers (GPB) format) before transmitting the data (e.g., using a Google Remote Procedure Call (gRPC) protocol). This improves data collection efficiency and facilitates intelligent interconnection. As mentioned above, gRPC is one example of a telemetry communication protocol. Other examples of telemetry protocols can include, e.g., Internet Protocol Flow Information Export (IPFIX), OpenTelemetry Protocol (OTLP), NetFlow, and Network Visibility Module (NVM).

OpenTelemetry is a Cloud Native Computing Foundation (CNCF) open source project that provides comprehensive support for distributed tracing. It provides an open source observability framework made up of a collection of tools, APIs, and SDKs. Further, OpenTelemetry enables information technology teams to instrument, generate, collect, and export telemetry data for analysis and to understand software performance and behavior.

The Google Remote Procedure Call (gRPC) protocol uses a cross-platform open source high performance remote procedure call framework to connect the large number of microservices running within and across its data centers.

Internet Protocol Flow Information Export (IPFIX) is an Internet Engineering Task Force (IETF) protocol that was created to provide a common, universal standard of export for Internet Protocol flow information from routers, probes, and other devices that are used by mediation systems, accounting/billing systems and network management systems to facilitate services such as measurement, accounting, and billing. The IPFIX standard defines how IP flow information is to be formatted and transferred from an exporter to a collector.

NetFlow technology can also be used for traffic flow information export. NetFlow provides the ability to collect IP network traffic as it enters or exits an interface. By analyzing the data provided by NetFlow, a network administrator can determine things such as the source and destination of traffic, class of service, and the causes of congestion. For example, a flow monitoring setup using NetFlow can include three main components: (i) a flow exporter, (ii) a flow collector; and an analysis application. The flow exporter aggregates packets into flows and exports flow records towards one or more flow collectors. The flow collector provides reception, storage and pre-processing of flow data received from a flow exporter. The analysis application analyzes received flow data in the context of intrusion detection or traffic profiling, for example. Routers and switches that support NetFlow can collect IP traffic statistics on all interfaces where NetFlow is enabled, and later export those statistics as NetFlow records toward at least one NetFlow collector (e.g., a server that does the actual traffic analysis).

Relatedly, a Network Visibility Module (NVM) collects flow context from an endpoint on or off premise and provides visibility into network-connected devices and user behaviors when coupled with applications that analyze the flow context and display the analysis on a dashboard. Examples of such applications include Stealthwatch CISCO and Splunk. The enterprise administrator can then do capacity and service planning, auditing, compliance, and security analytics. NVM provides the following services.

A flow collector can provide the ability to collect IP network traffic as it enters or exits an interface of a switch or a router. The flow collector can be used to determine the source of congestion in the network and the path of flow. With NVM on the endpoint, the flow is augmented by the endpoint context. The exported data provided with NVM which is sent via IPFIX can be compatible with CISCO NetFlow collectors as well as other 3rd party flow collection platforms such as Splunk, IBM Qradar, LiveAction. The exported data provided with NVM is sent out of band, which can prevent said data from being available when the data flow arrives at its destination. Further, the exported data provided with NVM can lack visibility into the application layer operations of the endpoint.

Improved systems and methods are desired for providing in-band metadata with a data flow. Further, improved systems and methods are desired for providing in-band metadata based on observations of the endpoint at the application layer.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 9C illustrates an example of header types for optional IPv6 extension headers, in accordance with some embodiments.

DESCRIPTION OF EXAMPLE EMBODIMENTS

Figure 1:
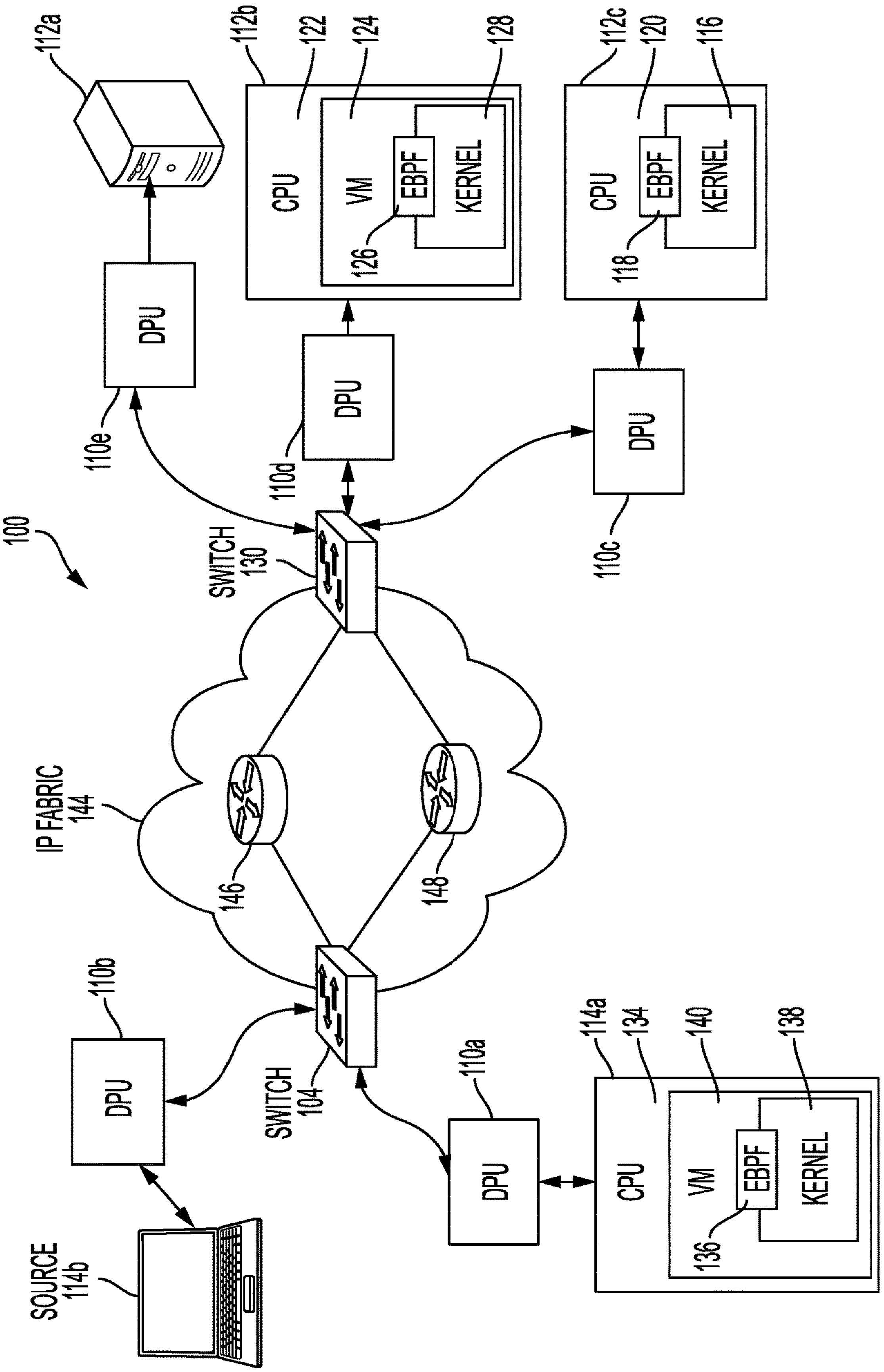
FIG. 1 illustrates a block diagram of an example of a subsystem of a network that includes data processing units (DPUs) that perform various network component functions, in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In some aspects, the techniques described herein relate to a method for adding in-band metadata to data flows, the method including: executing an application on a processor to generate data, the processor being in a source that transmits a data flow including the data to a destination via a network; executing an extended Berkley packet filter (eBPF) on the processor, the eBPF generating observations of the source, of the data, and/or of the application; encoding the data in payloads of packets of a data flow, and encoding, in the data flow, metadata that represents the observations generated by the eBPF; and signaling instructions to transmit the data flow via the network to the destination.

In some aspects, the techniques described herein relate to a method, further including: receiving the data flow at the destination; and determining, based on the metadata, a processing step for processing the data flow at the destination.

In some aspects, the techniques described herein relate to a method, wherein the processing step includes load balancing, micro-segmentation, and/or policy enforcement.

In some aspects, the techniques described herein relate to a method, wherein determining the processing step based on the metadata includes: determining whether the destination is in a same trust zone as the processor; and allowing the data flow into a workload of the destination, when the destination is in the same trust zone as the processor.

In some aspects, the techniques described herein relate to a method, wherein the observations are generated by the eBPF that is in a host that executes the applications, such that the eBPF generates the observations by observing the application at an application layer (L7) in an open systems interconnection (OSI) hierarchy.

In some aspects, the techniques described herein relate to a method, further including: processing the data flow through a data processing unit (DPU); and generating, at the DPU, additional metadata based on other observations of the processing of the data flow through the DPU, wherein the other observations are at layer 3 (L3) of the OSI hierarchy.

In some aspects, the techniques described herein relate to a method, wherein the additional metadata derived from the other observations of the DPU are encoded in one or more headers of an encapsulation protocol.

In some aspects, the techniques described herein relate to a method, wherein the encapsulation protocol is selected from the group consisting of generic routing encapsulation (GRE) protocol, generic UDP encapsulation (GUE) protocol, generic network virtualization encapsulation (Geneve) protocol, and a virtual extensible local area network (VXLAN) protocol.

In some aspects, the techniques described herein relate to a method, wherein the additional metadata is generated using another eBPF program operating in a host of the DPU.

In some aspects, the techniques described herein relate to a method, wherein the additional metadata is generated in hardware component of the DPU.

In some aspects, the techniques described herein relate to a method, wherein the additional metadata is used to determine whether to drop the data flow at a point along a path through the network that is prior to reaching the destination.

In some aspects, the techniques described herein relate to a method, wherein the metadata from the observations from the eBPF are encoded in headers of Internet protocol (IP) packets.

In some aspects, the techniques described herein relate to a method, wherein the headers of IP packets are optional Internet protocol version 6 (IPv6) extension headers.

In some aspects, the techniques described herein relate to a method, wherein the metadata from the observations from the eBPF are encoded in one or more transport layer security (TLS) extension fields.

In some aspects, the techniques described herein relate to a method, wherein the observations provide process context representing the execution of the application when generating the data.

In some aspects, the techniques described herein relate to a method, wherein the metadata includes a trust score based on the observations.

In some aspects, the techniques described herein relate to a method, further including: encapsulating the data flow using an encapsulation protocol that encrypts the data flow into an encrypted payload in an encapsulated data flow; and signaling instructions to transmit the encapsulated data flow via a tunnel through the network to the destination.

In some aspects, the techniques described herein relate to a method, wherein encrypting the data flow is performed via DPU offload, and an encryption protocol used for encrypting the data flow is an Internet Protocol Security (IPsec) protocol, Secure Socket Layer (SSL) protocol, or a Transport Layer Security (TLS) protocol.

In some aspects, the techniques described herein relate to a method, wherein the encapsulating of the data flow is performed by a data processing unit (DPU) at a source terminal of the tunnel; the DPU generates additional metadata based on other observations of the processing of the data flow through the DPU, the DPU encoding the additional metadata in headers of the encapsulated data flow, wherein the other observations are at layer 3 (L3) of an open systems interconnection (OSI) hierarchy; and the additional metadata provides a signal to another DPU at a destination end of the tunnel whether to drop the data flow before reaching a workload at the destination.

In some aspects, the techniques described herein relate to a method, wherein the metadata includes indicia of one or more identities including: (i) an identity of the application, (ii) an identity of a user of the application, and/or (iii) an identity of a source of data being processed by the application, (iv) a location of the processor, and/or (v) a destination address.

In some aspects, the techniques described herein relate to a computing apparatus including: a processor; and a memory storing instructions that, when executed by the processor, configure the apparatus to: execute an application on a processor to generate data, the processor being in a source that transmits a data flow including the data to a destination via a network; execute an extended Berkley packet filter (eBPF) on the processor, the eBPF generating observations of the source, of the data, and/or of the application; encode the data in payloads of packets of a data flow, and encoding, in the data flow, metadata that represents the observations generated by the eBPF; and signal instructions to transmit the data flow via the network to the destination.

In some aspects, the techniques described herein relate to a computing apparatus, wherein, when executed by the processor, the instructions further configure the apparatus to: receive the data flow at the destination; and determine, based on the metadata, a processing step for processing the data flow at the destination.

In some aspects, the techniques described herein relate to a computing apparatus, when executed by the processor, the instructions determine the processing step by configuring the apparatus to: determine the processing step is one or more of load balancing, micro-segmentation, or policy enforcement.

In some aspects, the techniques described herein relate to a computing apparatus, when executed by the processor, the instructions determine the processing step by configuring the apparatus to: determine whether the destination is in a same trust zone as the processor; and allow the data flow into a workload of the destination, when the destination is in the same trust zone as the processor.

In some aspects, the techniques described herein relate to a computing apparatus, wherein the observations are generated by the eBPF that is in a host that executes the applications, such that the eBPF generates the observations by observing the application at an application layer (L7) in an open systems interconnection (OSI) hierarchy.

In some aspects, the techniques described herein relate to a computing apparatus, when executed by the processor, the instructions further configure the apparatus to: process the data flow through a data processing unit (DPU); and generate, at the DPU, additional metadata based on other observations of the processing of the data flow through the DPU, wherein the other observations are at layer 3 (L3) of the OSI hierarchy.

In some aspects, the techniques described herein relate to a computing apparatus, wherein the additional metadata derived from the other observations of the DPU are encoded in one or more headers of an encapsulation protocol.

In some aspects, the techniques described herein relate to a computing apparatus, wherein the encapsulation protocol is selected from the group consisting of generic routing encapsulation (GRE) protocol, generic UDP encapsulation (GUE) protocol, generic network virtualization encapsulation (Geneve) protocol, and a virtual extensible local area network (VXLAN) protocol.

In some aspects, the techniques described herein relate to a computing apparatus, wherein the additional metadata is generated using another eBPF program operating in a host of the DPU.

In some aspects, the techniques described herein relate to a computing apparatus, wherein the additional metadata is generated in hardware component of the DPU.

In some aspects, the techniques described herein relate to a computing apparatus, wherein the additional metadata is used to determine whether to drop the data flow at a point along a path through the network that is prior to reaching the destination.

In some aspects, the techniques described herein relate to a computing apparatus, wherein the metadata from the observations from the eBPF are encoded in headers of Internet protocol (IP) packets.

In some aspects, the techniques described herein relate to a computing apparatus, wherein the headers of IP packets are optional Internet protocol version 6 (IPv6) extension headers.

In some aspects, the techniques described herein relate to a computing apparatus, wherein the metadata from the observations from the eBPF are encoded in one or more transport layer security (TLS) extension fields.

In some aspects, the techniques described herein relate to a computing apparatus, wherein the observations provide process context representing the execution of the application when generating the data.

In some aspects, the techniques described herein relate to a computing apparatus, wherein the metadata includes a trust score based on the observations.

In some aspects, the techniques described herein relate to a computing apparatus, wherein, when executed by the processor, the instructions further configure the apparatus to: encapsulate the data flow using an encapsulation protocol that encrypts the data flow into an encrypted payload in an encapsulated data flow; and signal instructions to transmit the encapsulated data flow via a tunnel through the network to the destination.

In some aspects, the techniques described herein relate to a computing apparatus, wherein, when executed by the processor, the instructions encrypt the data flow by configuring the apparatus to: encrypt the data flow via DPU offload, and encrypt the data flow using an encryption protocol used for encrypting the data flow is an Internet Protocol Security (IPsec) protocol, Secure Socket Layer (SSL) protocol, or a Transport Layer Security (TLS) protocol.

In some aspects, the techniques described herein relate to a computing apparatus, wherein, when executed by the processor, the instructions encrypt the data flow by configuring the apparatus to encapsulate the data flow by a data processing unit (DPU) at a source terminal of the tunnel; the DPU generates additional metadata based on other observations of the processing of the data flow through the DPU, the DPU encoding the additional metadata in headers of the encapsulated data flow, wherein the other observations are at layer 3 (L3) of an open systems interconnection (OSI) hierarchy; and the additional metadata provides a signal to another DPU at a destination end of the tunnel whether to drop the data flow before reaching a workload at the destination.

In some aspects, the techniques described herein relate to a computing apparatus, wherein the metadata includes indicia of one or more identities including: (i) an identity of the application, (ii) an identity of a user of the application, and/or (iii) an identity of a source of data being processed by the application, (iv) a location of the processor, and/or (v) a destination address.

In some aspects, the techniques described herein relate to a non-transitory computer-readable storage medium, the computer-readable storage medium including instructions that when executed by a computer, cause the computer to: execute an application on a processor to generate data, the processor being in a source that transmits a data flow including the data to a destination via a network; execute an extended Berkley packet filter (eBPF) on the processor, the eBPF generating observations of the source, of the data, and/or of the application; encode the data in payloads of packets of a data flow, and encoding, in the data flow, metadata that represents the observations generated by the eBPF; and signal instructions to transmit the data flow via the network to the destination.

In some aspects, the techniques described herein relate to a non-transitory computer-readable storage medium, wherein the instructions further cause the computer to: receive the data flow at the destination; and determine, based on the metadata, a processing step for processing the data flow at the destination.

In some aspects, the techniques described herein relate to a non-transitory computer-readable storage medium, wherein the instructions causing the computer to determine the processing step by further causing the computer to: determine the processing step is one or more of load balancing, micro-segmentation, or policy enforcement.

In some aspects, the techniques described herein relate to a non-transitory computer-readable storage medium, wherein the instructions causing the computer to determine the processing step by further causing the computer to: determine whether the destination is in a same trust zone as the processor; and allow the data flow into a workload of the destination, when the destination is in the same trust zone as the processor.

In some aspects, the techniques described herein relate to a non-transitory computer-readable storage medium, wherein the observations are generated by the eBPF that is in a host that executes the applications, such that the eBPF generates the observations by observing the application at an application layer (L7) in an open systems interconnection (OSI) hierarchy.

In some aspects, the techniques described herein relate to a non-transitory computer-readable storage medium, wherein the instructions further cause the computer to: process the data flow through a data processing unit (DPU); and generate, at the DPU, additional metadata based on other observations of the processing of the data flow through the DPU, wherein the other observations are at layer 3 (L3) of the OSI hierarchy.

In some aspects, the techniques described herein relate to a non-transitory computer-readable storage medium, wherein the additional metadata derived from the other observations of the DPU are encoded in one or more headers of an encapsulation protocol.

In some aspects, the techniques described herein relate to a non-transitory computer-readable storage medium, wherein the encapsulation protocol is selected from the group consisting of generic routing encapsulation (GRE) protocol, generic UDP encapsulation (GUE) protocol, generic network virtualization encapsulation (Geneve) protocol, and a virtual extensible local area network (VXLAN) protocol.

In some aspects, the techniques described herein relate to a non-transitory computer-readable storage medium, wherein the additional metadata is generated using another eBPF program operating in a host of the DPU.

In some aspects, the techniques described herein relate to a non-transitory computer-readable storage medium, wherein the additional metadata is generated in hardware component of the DPU.

In some aspects, the techniques described herein relate to a non-transitory computer-readable storage medium, wherein the additional metadata is used to determine whether to drop the data flow at a point along a path through the network that is prior to reaching the destination.

In some aspects, the techniques described herein relate to a non-transitory computer-readable storage medium, wherein the metadata from the observations from the eBPF are encoded in headers of Internet protocol (IP) packets.

In some aspects, the techniques described herein relate to a non-transitory computer-readable storage medium, wherein the headers of IP packets are optional Internet protocol version 6 (IPv6) extension headers.

In some aspects, the techniques described herein relate to a non-transitory computer-readable storage medium, wherein the metadata from the observations from the eBPF are encoded in one or more transport layer security (TLS) extension fields.

In some aspects, the techniques described herein relate to a non-transitory computer-readable storage medium, wherein the observations provide process context representing the execution of the application when generating the data.

In some aspects, the techniques described herein relate to a non-transitory computer-readable storage medium, wherein the metadata includes a trust score based on the observations.

In some aspects, the techniques described herein relate to a non-transitory computer-readable storage medium, wherein the instructions further cause the computer to: encapsulate the data flow using an encapsulation protocol that encrypts the data flow into an encrypted payload in an encapsulated data flow; and signal instructions to transmit the encapsulated data flow via a tunnel through the network to the destination.

In some aspects, the techniques described herein relate to a non-transitory computer-readable storage medium, wherein the instructions cause the computer to encrypt the data flow by further causing the computer to: encrypt the data flow via DPU offload, and encrypt the data flow using an encryption protocol used for encrypting the data flow is an Internet Protocol Security (IPsec) protocol, Secure Socket Layer (SSL) protocol, or a Transport Layer Security (TLS) protocol.

In some aspects, the techniques described herein relate to a non-transitory computer-readable storage medium, wherein, the instructions causing the computer to encrypt the data flow further cause the computer to encapsulate the data flow by a data processing unit (DPU) at a source terminal of the tunnel; the DPU generates additional metadata based on other observations of the processing of the data flow through the DPU, the DPU encoding the additional metadata in headers of the encapsulated data flow, wherein the other observations are at layer 3 (L3) of an open systems interconnection (OSI) hierarchy; and the additional metadata provides a signal to another DPU at a destination end of the tunnel whether to drop the data flow before reaching a workload at the destination.

In some aspects, the techniques described herein relate to a non-transitory computer-readable storage medium, wherein the metadata includes indicia of one or more identities including: (i) an identity of the application, (ii) an identity of a user of the application, and/or (iii) an identity of a source of data being processed by the application, (iv) a location of the processor, and/or (v) a destination address.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for improved systems and methods for providing in-band metadata with a data flow. Further, improved systems and methods are desired for providing in-band metadata based on observations of the endpoint at the application layer.

FIG. 1 illustrates a system 100, which is an example of a portion of a network (e.g., a data center 500 or an internet edge security framework 400). System 100 provides an example of how metadata can be added to packets from an application to provide increased observability and security. System 100 can include various sources of data (e.g., source 114*a* and source 114*b*) which transmit the data via the IP fabric 144 to one or more destinations (e.g., destination 112*a*, destination 112*b*, and destination 112*c*).

Source 114*a* can include a CPU 134 on which a virtual machine (i.e. VM 140) is running, and VM 140 can include a kernel 138 that is accessed via eBPF 1366.

Destination 112*b* can include a CPU 122 on which a virtual machine (i.e. VM 124) is running, and VM 124 can include a kernel 128 that is accessed via eBPF 126. destination 112*c* can include a CPU 120 that has a kernel 116 and an eBPF 118. Any of the DPUs, switches, routers, and hosts on DPUs (which can include ePBFs) can operate network nodes.

According to certain non-limiting examples, the data can be generated by an application running on VM 140, which is on the CPU 134 of source 114*a*. An eBPF 136 on the VM 140 observes the operations of the application, including, e.g., system calls and other interactions with the kernel 138. Generally, the eBPF 136 can provide observability information at the application layer of the open systems interconnection (OSI) hierarchy. The application can be part of a cloud-based application that includes software installed on a user device (e.g., source 114*a*) and includes software installed on a server (e.g., destination 112*b*). User interactions at the source endpoint generate data that is then sent to the destination endpoint where additional actions are taken on the data, when there are sufficient indicia that the data is secure.

For example, the application can be a JAVA application running in VM 140, and the application is performing some business logic in which the application reaches out to a database to use some information that is read from the database to perform the business logic. The eBPF 136 can monitor the execution of the application, noting observations/information such as the user ID, the application ID, and that the application retrieved information from a given database (other examples of the noted observations/information are provided below). The application generates a data flow (referred to as the egress data) that includes the noted observations as metadata (e.g., included in-band in IP packet headers). Along the path (e.g., at the destination) the egress data ends up going through a firewall (or some sort of other filtering technology). the firewall can then look at the metadata of the egress data, and based on the noted observations in the metadata, the firewall can apply selected security processes and/or policies, pass the egress data through the firewall, or drop the data flow, for example. For example, when the egress data comes from a user ID and an application ID that is whitelisted, the egress data is passed through the firewall.

The eBPF 136 can monitor the execution of the application, noting information such as: (i) the device (e.g., the endpoint, irrespective of its location); (ii) the user (e.g., the one logged into the endpoint); (iii) the application (e.g., what generates the traffic); (iv) the location (e.g., the network location the traffic was generated on); and/or (v) the destination (e.g., the fully qualified domain name (FQDN) to which this traffic was intended).

Additionally or alternatively, the eBPF 136 can generate and/or analyze program traces for the application. Based on observations of the application, the eBPF 136 can determine whether the application is exhibiting indicia of behaving anomalously or indicia of cyber threats (e.g., intrusion detection signatures, evidence of a compromise, a vulnerability, or an exploit of vulnerability). Based on the analysis of the observations of the application, the eBPF 136 can encode a trust score in the metadata of a data flow generated by the application and sent through the IP fabric 144 to one of the destinations (e.g., destination 112*b*). Upon reaching the destination, an eBPF program at the destination (e.g., eBPF 126) or a DPU in front of the workload at the destination (e.g., DPU 110*d*) can access the trust score in the metadata and determine what action to take of the data flow. For example, the trust score can be used to essentially perform micro-segmentation at sire speed on the fly (e.g., in real time). For example, the eBPF, DPU, or other network component located at the destination can function as a firewall that sees the trust score in the metadata, and based on the trust score either allows the data flow into the workload or denies entry.

According to certain non-limiting examples, a data center or network can be divided into trust zones. For example, users and/or network professionals can manually segment their network into trust zones (e.g., this can occur for virtual local area networks (VLANs)). Consider, for example, the case in which a customer puts all of the voice traffic on one VLAN, and all of the data center traffic on another VLAN. The voice traffic can be in a lower trust zone, and the data center traffic can be in a higher trust zone. The trust scores allow a related type of segmentation, except this segmentation can provide finer granularity by dynamically providing application-level trust zones. For example, these dynamically created application-level trust zones can essentially provide microsegmentation at wire speed on the fly. By allowing the applications to assign trust scores in the metadata that are then used by the destination to determine whether the source and destination are in the same dynamically created trust zone. Using the trust score, e.g., a given business application can talk to a given database, because the trust score indicates that they are trust zone. However, a different application in a different trust zone (as indicated by the trust score) would not be able to talk to the given database. For example, a telephone in a different trust zone would not be able to talk to the given database, because the telephone is in a different trust zone. This type of annotation can be added to the metadata using an eBPF or DPU. For example, this type of information regarding trust scores and trust zones can be provided in the metadata by an eBPF, as a way to provide microsegmentation that is dynamically based on the indicated trustworthiness of the applications.

As discussed with reference to FIG. 3, a virtual network can be used with an encapsulation protocol to provide a tunnel through the IP fabric 144. Further, switch 104 and switch 130 can be implemented in DPUs, and tunnel termination can occur at the DPUs. For example, a tunnel can be implemented via an encapsulation protocol such as GRE, VX LAN, or Geneve. Whereas the eBPF in a host (e.g., VM 140) can include metadata in headers of an IP packet based on L7 observation within the host, the DPU implementing a virtual switch can encapsulate the IP packet within a packet of the virtual network, and the DPU can include additional metadata in the optional fields of the packet of the virtual network. This additional metadata can be L3 observations made by the DPU (e.g., the virtual switch).

According to certain non-limiting examples, the virtual network can be a VXLAN network. VXLAN provides a Layer 2 (L2) overlay scheme over a Layer 3 (L3) network. For example, VXLAN can use MAC Address-in-User Datagram Protocol (MAC-in-UDP) encapsulation to provide a means to extend Layer 2 segments across the data center network. VXLAN can support a flexible, large-scale multi-tenant environment over a shared common physical infrastructure. The transport protocol over the physical data center network can include IP plus UDP. For example, VXLAN can define a MAC-in-UDP encapsulation scheme where the original Layer 2 frame has a VXLAN header added and is then placed in a UDP-IP packet. With this MAC-in-UDP encapsulation, VXLAN tunnels an L2 network over an L3 network. The packets for VXLLAN can include the original L2 frame proceeded by a VXLAN header, which is encapsulated with a UDP header, which is further encapsulated to have an outer IP header, and then that entire structure is encapsulated with an outer MAC header.

A DPU implementing a virtual switch can use an optional field in one or more of the headers to provide metadata that is used for observability or security functions. This metadata can be added using an eBPF operating in a host on the DPU or can be added using other hardware within the DPU (e.g., a hardware engine, an accelerator, or networking circuitry). The observations on the DPU can include various network protocols and security processes/policies performed at the DPU on the data flow. As discussed with reference to FIG. 7, DPUs can support software including network protocol offload (e.g., TCP/IP acceleration, RDMA and RPC); initiator and target side storage (e.g., block and file protocols); high-level application APIs (e.g., compute, network and storage); fine grain load balancing, traffic management, and quality of service (QOS); network virtualization and network function virtualization (NFV); and firewall, security, deep packet inspection (DPI), and encryption (e.g., IPsec and SSL/TLS).

Returning to FIG. 1, the application generating the data flow (e.g., the egress data) can run on one of the sources (e.g., source 114*a* or source 114*b*). Metadata can be generated and added to the data flow by the eBPF 136 on the VM 140, which is executed by the CPU 134 of the source 114*a*. Additionally or alternatively, an eBPF program can operate on the CPU 134. The data flow can go from the source through the IP fabric 144, which can include switch 104, switch 130, router 146, and router 148. As discussed above, the DPUS (e.g., DPU 110*a*, DPU 110*b*, DPU 110*c*, DPU 110*d*, and DPU 110*c*) can perform various networking functions, including, e.g., the functions of the switches 104 and 130. These DPUs can also add additional metadata to the packets (e.g., the encapsulated packets sent via a virtual network) based on observations made at the DPUs.

Metadata that is added to the optional headers or optional fields of the egress data flows at the source can be read from the ingress data flows at the destination and used for determining next actions taken on the received data flows. For example, for destination 112*a*, the DPU 110*c* can read the additional metadata applied by a DPU at the source (e.g., DPU 110*a*), and the additional metadata can inform a determination of processing steps at DPU 110*c*, or the additional metadata can be passed along to the destination 112*a* to inform processing that occurs there.

Similarly, for destination 112*b*, the DPU 110*d* can read the additional metadata applied by a DPU at the source (e.g., DPU 110*a*), and the additional metadata can inform a determination of processing steps at DPU 110*d*, or the additional metadata can be passed along to the destination 112*a* to inform processing that occurs there. Additionally, the eBPF 126 can read metadata generated by eBPF 136, which is encoded, e.g., on a header of the IP packets. The additional metadata from DPU 110*a* and the metadata from eBPF 136 can be used together (e.g., correlated) to inform processing steps performed at VM 124 and/or in kernel 128. The metadata and the process steps that are informed by it can be performed independently from a cloud-based portion of the application running on CPU 122 or on VM 124.

For destination 112*c*, the application can run directly on the CPU (e.g., CPU 120) rather than on a VM that is running on the CPU. For destination 112*c*, the DPU 110*c* can read the additional metadata applied by a DPU at the source (e.g., DPU 110*a*), and the additional metadata can inform a determination of processing steps at DPU 110*c*, or the additional metadata can be passed along to the destination 112*c* to inform processing that occurs there. Additionally, the eBPF 126 can read metadata generated by eBPF 136, which is encoded, e.g., on a header of the IP packets. The additional metadata from DPU 110*a* and the metadata from eBPF 136 can be used together (e.g., correlated) to inform processing steps performed at in the CPU 120 and/or in kernel 116.

Figure 2:
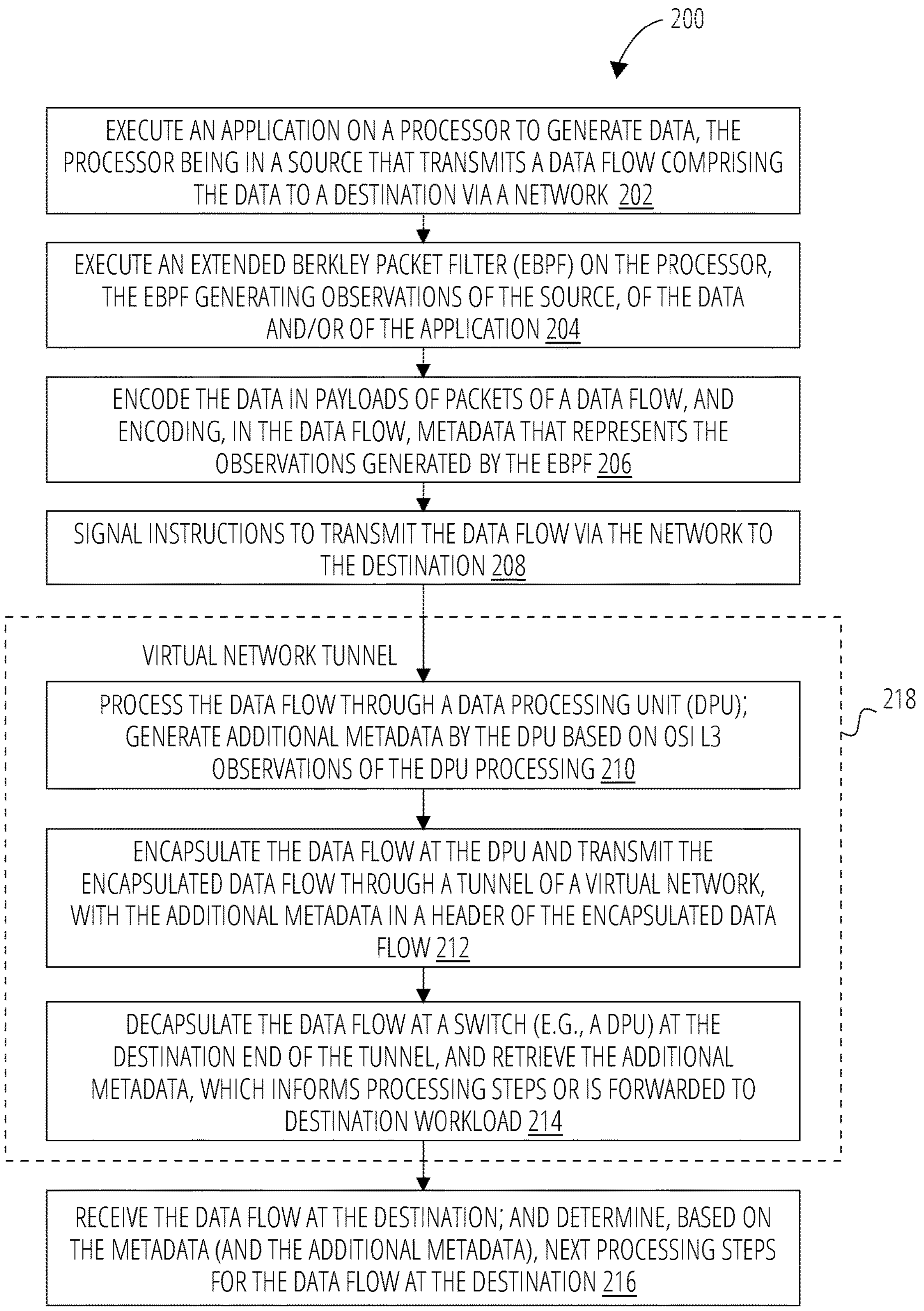
FIG. 2 illustrates an example of a method for adding in-band metadata to data flows, in accordance with some embodiments.

FIG. 2 illustrates an example method 200 for adding in-band metadata to data flows based on observations of an application generating the data flow. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, step 202 of method 200 includes executing an application on a processor to generate data, the processor being in a source that transmits a data flow comprising the data to a destination via a network.

According to some examples, step 204 of method 200 includes executing an extended Berkeley packet filter (eBPF) on the processor, the eBPF generating observations of the source, of the data, and/or of the application.

According to some examples, step 206 of method 200 includes encoding the data in payloads of packets of a data flow, and encoding, in the data flow, metadata that represents the observations generated by the eBPF.

According to some examples, step 208 of method 200 includes signaling instructions to transmit the data flow via the network to the destination.

Method 200 can include process 218, which adds additional metadata when encapsulating the data flows in a virtual network. Process 218 can include steps 210, 212, and 214.

In step 210, process 218 includes processing the data flow through a data processing unit (DPU) and generating additional metadata by the DPU based on OSI L3 observations of the DPU processing.

In step 212, process 218 includes encapsulating the data flow at the DPU and transmitting the encapsulated data flow through a tunnel of a virtual network, with the additional metadata in a header of the encapsulated data flow.

In step 214, process 218 includes decapsulating the data flow at a switch (e.g., a DPU) at the destination end of the tunnel and retrieving the additional metadata, which informs processing steps or is forwarded to the destination.

According to some examples, in step 216, the method includes receiving the data flow with the metadata at the destination. Based on the metadata (and the additional metadata), the next processing steps are determined for the data flow at the destination.

Figure 3:
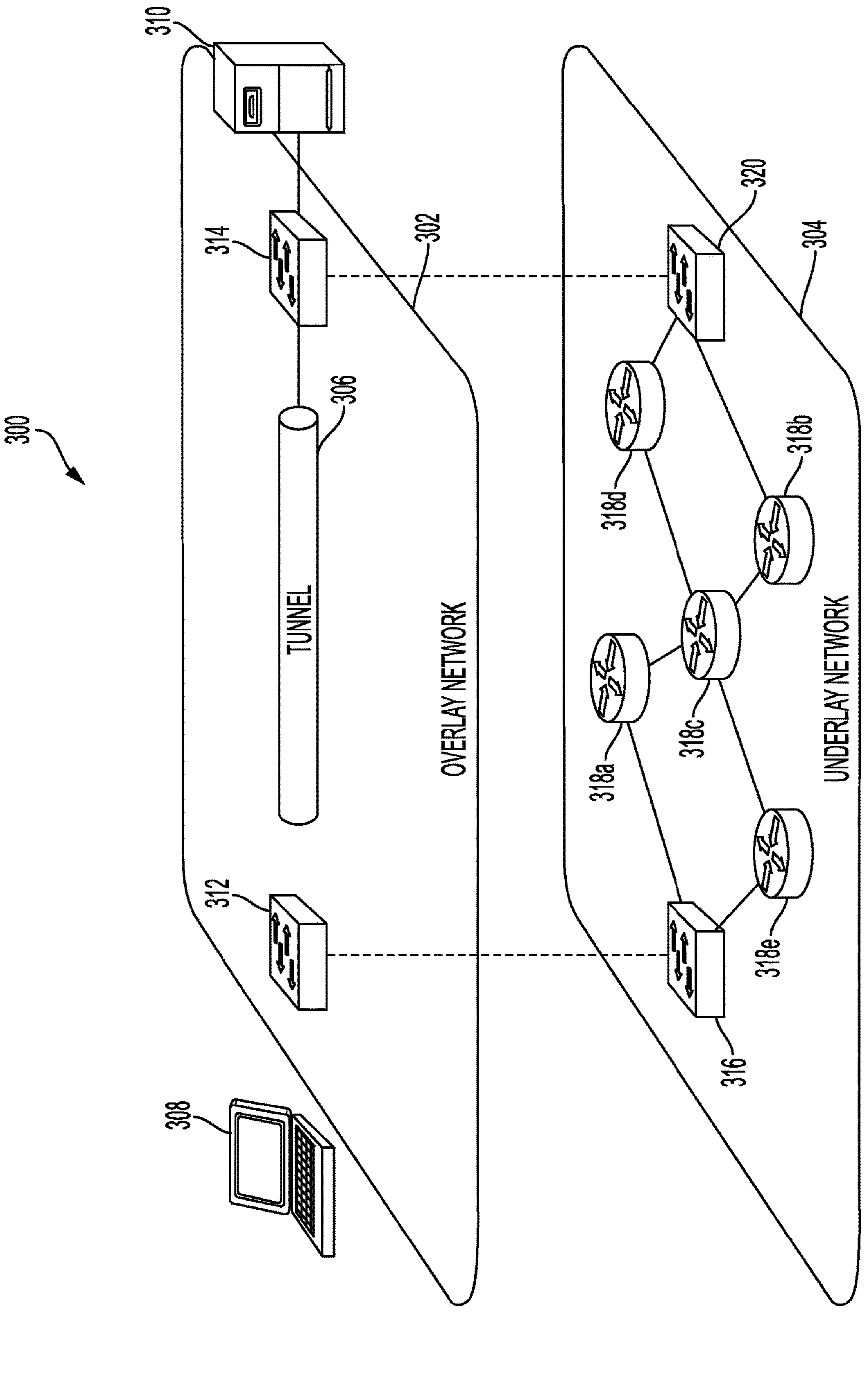
FIG. 3 illustrates an example of an overlay network on an underlay network, in accordance with some embodiments.

FIG. 3 illustrates a system 300 that includes an overlay network 302, which is a virtual network, that operates on an underlay network 304, which is an actual, physical network. Virtual, overlay networks can be used to implement encapsulation protocols such as VXLAN packets, Generic Routing Encapsulation (GRE) or Generic UDP Encapsulation (GUE) to encapsulate data and send it through a tunnel 306.

For example, GRE is a tunneling protocol that can encapsulate a wide variety of network layer protocols inside virtual point-to-point links or point-to-multipoint links over an Internet Protocol network. GUE provides encapsulation of user data (Application layer) into a UDP datagram (Transport layer) over IP (Network layer) inside some Data link layer protocol. Generic Network Virtualization Encapsulation (Geneve) is a network encapsulation protocol created by the IETF in order to unify the efforts made by other initiatives like VXLAN and NVGRE, with the intent to eliminate the wild growth of encapsulation protocols.

In FIG. 3, the overlay network 302 can include a virtual switch 312 that corresponds to a physical switch 316 and receives ingress data from a source node 308 (e.g., a user device, such as a laptop or smart phone) encapsulates the data and sends it through the tunnel 306 to the virtual switch 314. The virtual switch 314 corresponds to a physical switch 320 and decapsulates the received encapsulated data. After decapsulation, the virtual switch 314 sends the data to the destination node 310 (e.g., a server).

In FIG. 3, the underlay network 304 can include a physical switch 316, a physical switch 320, and a series of routers (e.g., router 318*a*, a router 318*b*, a router 318*c*, a router 318*d*, and a router 318*c*) that make up a network fabric.

According to certain non-limiting examples, the overlay network 302 can be a VXLAN overlay network. The virtual switch 312 and virtual switch 314 can be VXLAN Tunnel EndPoints (VTEPs) that provide connectivity between the overlay network 302 and the underlay network 304 networks. The VTEP can perform frame encapsulation into VXLAN packets to transport them across IP networks (e.g., the underlay network 304) and perform de-encapsulation upon exiting the VXLAN channel (e.g., tunnel 306). The underlay network 304 can operate without any awareness on the VXLAN. That is, the underlay network 304 treats the VXLAN packet just like any other normal packet. The VTEPs can be hardware based (e.g., using CISCO Nexus 9000 switch series) or software based (e.g., VXLAN capable hypervisor switch in hypervisor host). For example, a hypervisor host can be instantiated in a host of a data processing unit (DPU). The VTEPs can have two interfaces: (i) a local LAN interface and an IP interface. The local LAN interface can provide local communication by bridging endpoints (e.g., the source node 308 or the destination node 310) connected to VTEPs. The IP interface can connect the underlay layer 3 network also known as transport network. The IP address are bound to the IP interface to uniquely identify VTEP in the network.

The overlay network 302 and underlay network 304 can operate independently of each other. Overlay network 302 is virtual and requires the underlay network 304 to function. Changes made in the overlay network 302, however, do not impact the underlay network 304. For example, links can be added/removed in the underlay network as long as destination is reachable by routing protocol overlay network remains unchanged.

Returning to the non-limiting VXLAN example, encapsulation (decapsulation) of VXLAN traffic can be done by the VTEPs adding (removing) additional fields. These additional field can include, e.g., (i) an external MAC address (e.g., tunnel endpoint VTEP destination media access control address); (ii) an external source MAC address (e.g., tunnel VTEP source Mac address); (iii) an external destination IP address (e.g., tunnel endpoint VTEP destination IP address); (iv) an external source IP address (e.g., tunnel VTEP source IP address); and (v) an external UDP header (e.g., UDP port: 4789). VXLAN can act as an extension for VLAN (layer 2) and extend layer 2 segments so tenant workload can be distributed across physical pods in data centers. VXLAN can provides 24-bit segment ID referred as VXLAN network identifier (VNID) to enable 16 million VXLAN segments. VXLAN can transmit packets through underlay network based on layer 3 header and it takes advantage of layer 3 routing, ECMP routing and all other available routing protocols to use all paths.

VXLAN is discussed here to illustrate one non-limiting example of network virtualization. Generally, there are many examples of network virtualization, such as GRE, GUE, and Geneve. For example, a description of Geneve can be found in RFC 8926, available at https://datatracker.ietf.org/doc/rfc8926/, which is hereby incorporated in its entirety. A person of ordinary skill in the art would understand, that when the systems and methods disclosed herein use network virtualization, any of the available techniques can be used.

According to certain non-limiting examples, the virtual switch 312 and the virtual switch 314 can be implemented in hosts on DPUs that are proximate (within the network) to the source node 308 and the destination node 310.

Figure 4:
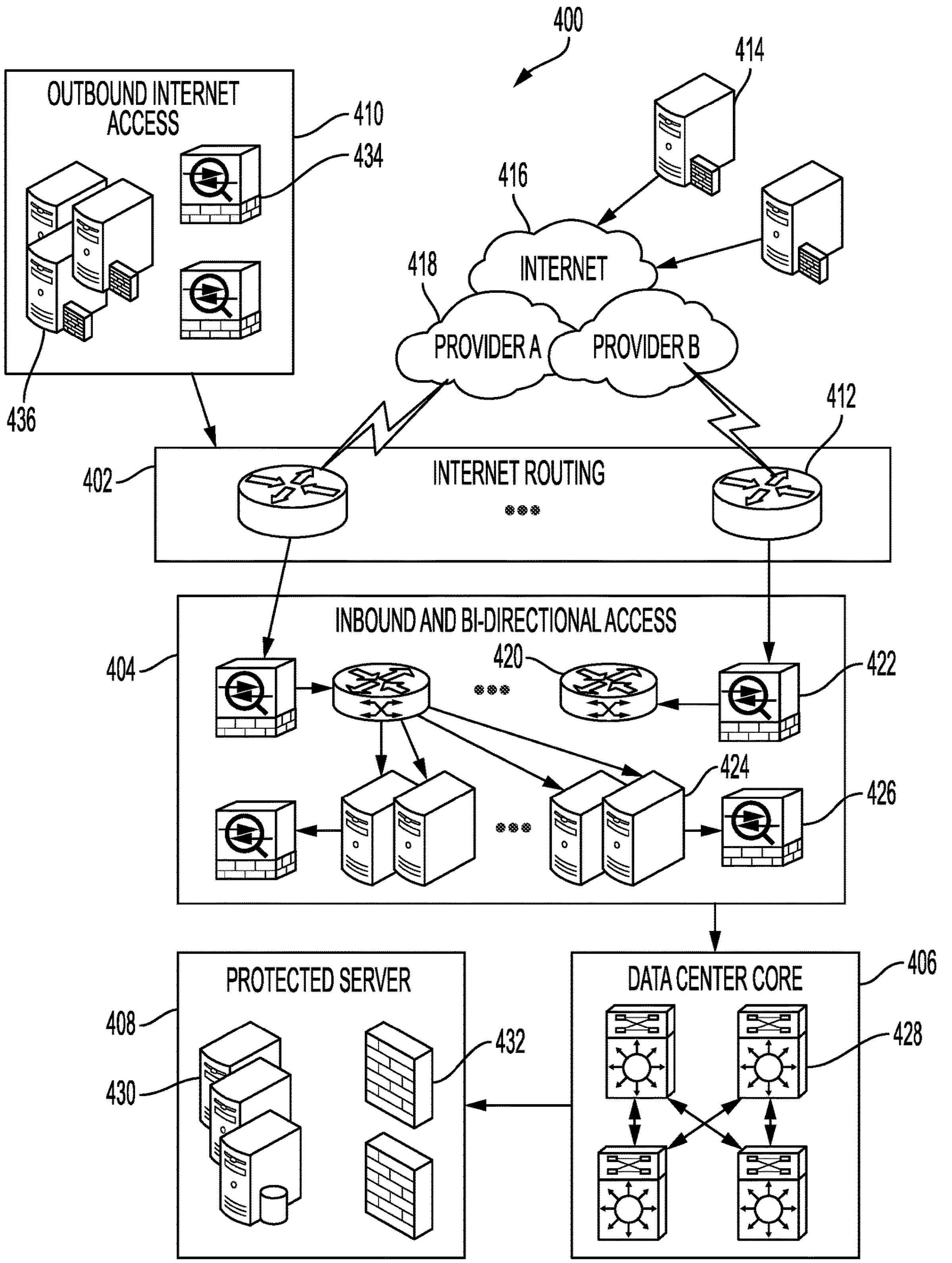
FIG. 4 illustrates a block diagram of an example of an e-commerce network that implements the dynamically programmed security services in network components that are placed in front of respective workloads, in accordance with some embodiments.

FIG. 4 illustrates a block diagram of one non-limiting example of an internet edge security framework 400 the includes internet routing 402, inbound and bi-directional access 404, a data center core 406, a back-end protected server 408, and outbound internet access 410. The internet edge security framework 400 can exemplify several aspects of security principles that are applicable for cloud computing, such as in secure web and/or e-commerce design. The internet edge security framework 400 can provide an IP fabric for routing data flows between a source and a destination in accordance with the systems and methods disclosed herein.

According to certain non-limiting examples, the proxy server 414 can be a global web cache proxy server that provides enhanced website response to clients within the world wide web (WWW) and provides additional distributed denial of service (DOS) protection and flooding protection. Traffic from the proxy server 414 is conducted through the internet 416 via one or more providers 418. The internet routing can be provided by one or more routers 412, which can be multi-homed border gateway protocol (BGP) internet routers that can include RFC 1918 and RFC 330 address filtering and RFC 2827 and RFC 3704 best practice methods. Further, internet routing 402 can provide border gateway protocol (BGP) transit autonomous system AS prevention mechanisms such as AS filtering, no-export community value and RFC 4272 best practices. RFC refers to a Request for Comments technical note or publication, which is a publication in a series from the principal technical development and standards-setting bodies for the Internet, most prominently the Internet Engineering Task Force (IETF).

According to certain non-limiting examples, inbound and bi-directional access 404 can be an external demilitarized zone (DMZ) that provides, e.g., external firewalls (e.g., ingress firewall 422) and/or intrusion prevention system (IPS). For example, inbound and bi-directional access 404 can provide protection to public Internet Protocol (IP) addressed dedicated, internally un-routable address spaces for communications to load balancers and server untrusted interfaces. The inbound and bi-directional access 404 can be tuned to provide additional transmission control protocol (TCP) synchronize message (SYN) flooding and other DoS protection. In addition to providing reconnaissance scanning mitigation, the IPS service modules (e.g., provided by the load balancer 420) can protect against man-in-the-middle and injection attacks.

The load balancers 420 can provide enhanced application layer security and resiliency services in terminating HTTPS traffic (e.g., HTTPS traffic on port "443") and communicating with front-end web servers 424 on behalf of external clients. For example, external clients do not initiate a direct TCP session with the front-end web servers 424. According to certain non-limiting examples, only the front-end web servers 424 receive requests on untrusted interfaces, and the front-end web servers 424 only make requests to the back-end servers 430 on trusted interfaces. The data center core 406 can include several route switch processors 428.

The protected server 408 is protected by the back-end firewall 432 and IPS to provide granular security access to back-end databases. The protected server 408 protects against unauthorized access and logs blocked attempts for access.

According to certain non-limiting examples, the internet edge security framework 400 provides defense in depth. Further, internet edge security framework 400 can advantageously use a dual-NIC (network interface controller) configured according to a trusted/un-trusted network model as a complement to a layered defense in depth approach.

According to certain non-limiting examples, the internet edge security framework 400 can include a DMZ environment (e.g., inbound and bi-directional access 404), which can be thought of as the un-trusted side of the infrastructure. The front-end web servers 424 can have a network interface controller (NIC), which includes the ingress firewall 422 and through which requests are received from outside of the internet edge security framework 400. Additionally, servers can be configured with a second NIC (e.g., egress firewall 426) and can connect to a trusted network (e.g., protected server 408) that is configured with an internal RFC 1918 address. According to certain non-limiting examples, firewall services can be provided for protected server 408, which is in an area of higher trust. Front-end web servers 424 can make back-end requests on the egress firewall 426. According to certain non-limiting examples, front-end web servers 424 can limit receiving requests to the un-trusted NIC, and front-end web servers 424 can limit making requests to the trusted NIC.

According to certain non-limiting examples, an additional layer of protection can be added by placing a load balancer (e.g., load balancer 420) in front of the front-end web servers 424. For example, the load balancers 420 can terminate TCP sessions originating from hosts on the internet. Further, the load balancers 420 can act as proxies, and initiate another session to the appropriate virtual IP (VIP) pool members, thereby advantageously providing scalability, efficiency, flexibility, and security.

Further regarding internet routing 402, the edge router 412 can provide IP filtering. For example, firewalls can be integrated with the routers 412. These firewalls can filter out traffic and reduce the footprint of exposure. For example, router 412 can be used to filter RFC 1918 and 3330 addresses. Further, the router 412 and/or ingress firewall 422 can be used to perform ingress filtering (e.g., RFC 2827 and RFC 3704) to cover multi-homed networks. Additionally or alternatively, the router 412 can provide some basic spoofing protection, e.g., by straight blocking large chunks of IP space that are not used as source addresses on the internet. Depending on its capacity, the router 412 can be used to provide some additional filtering to block, e.g., blacklisted IP blocks such as those defined in RFC 5782. Additionally or alternatively, router 412 can provide protection against BGP attacks, as discussed, e.g., in RFC 4272 and discussed in http://www.cisco.com/web/about/security/intelligence/protecting_bgp.html, which is hereby incorporated by reference in its entirety.

In addition to using dual NICs, the internet edge security framework 400 further illustrates using two separate environments on two different firewall pairs and/or clusters (e.g., a front-end environment such as the inbound and bi-directional access 404 and a back-end environment such as the protected server 408. According to certain non-limiting examples, the internet edge security framework 400 can use a simplified architecture with a high availability (HA) firewall pair for the front end and a separate HA firewall pair for the back end. The back-end environment can include the databases and any other sensitive file servers.

For example, inbound web requests can have the following structure: End host sources secure SSL session=>(Internet Cloud)=>Edge Routers=>Edge Firewall un-trusted DMZ=> (optional) Load Balancer=>Un-trusted web server NIC=/=Trusted web server NIC initiates a database fetch to the back end server=>Edge firewall trusted DMZ (RFC 1918)=>Data center network core=>Back-End firewall=>High security database DMZ server.

Regarding outbound internet access 410, the internet edge security framework 400 can use a web proxy solution to provide internet access for internal clients. The outbound internet access 410 can include firewalls 434 and outbound proxy servers 436. The outbound proxy servers 436 can provide web filtering mechanisms, internet access policy enforcement and most provide some flavor of data loss prevention, SSL offloading, activity logging, and audit capabilities, for example. In the reverse fashion from the inbound connectivity module, proxy servers can receive requests on trusted interfaces and can make requests on un-trusted interfaces.

Figure 5A:
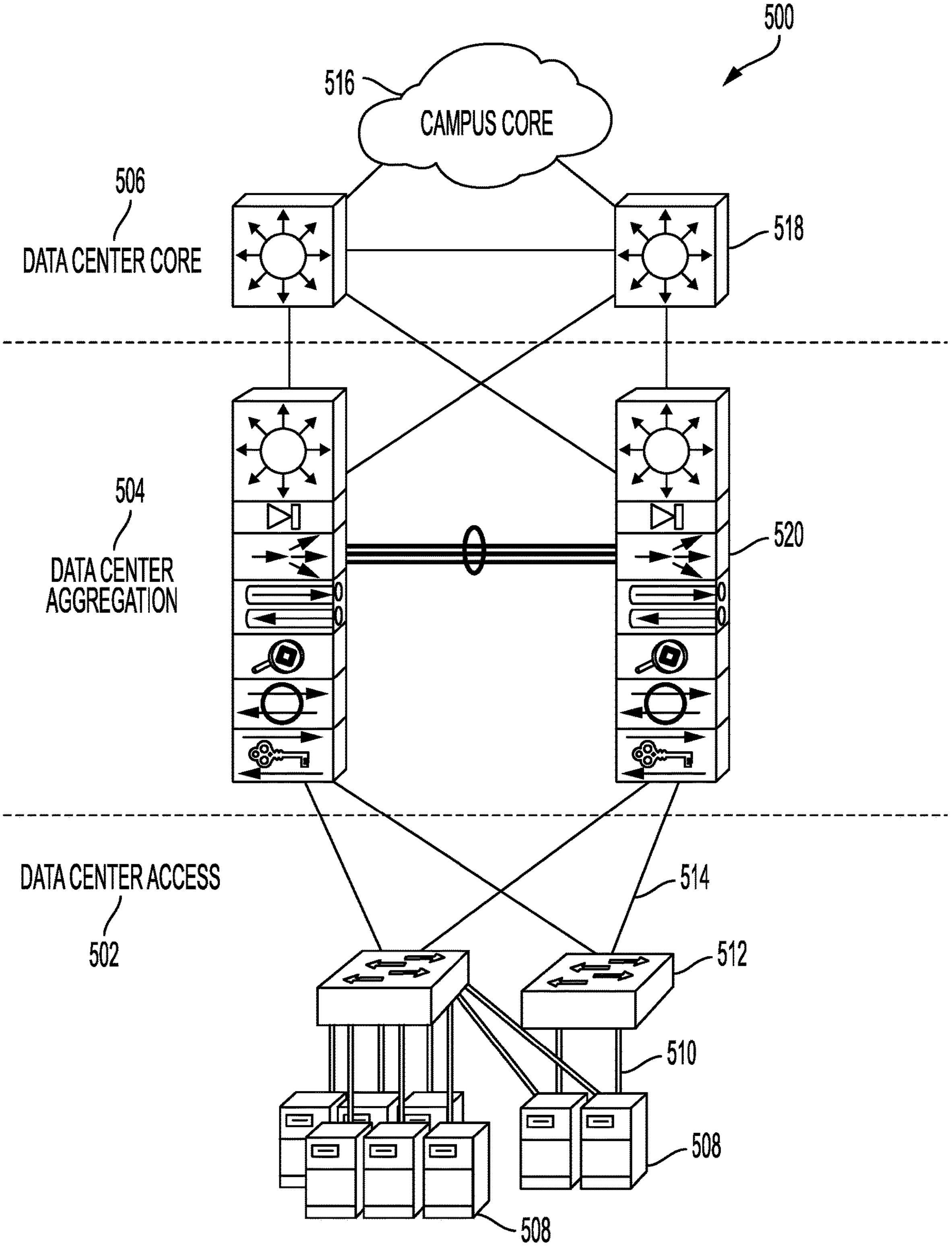
FIG. 5A illustrates a block diagram of an example of a network having an access cluster in the access layer, in accordance with some embodiments.

FIG. 5A illustrates a first non-limiting example of a multi-tier data center 500, which includes data center access 502, data center aggregation 504, and data center core 506. The data center 500 provides computational power, storage, and applications that can support an enterprise business, for example. The data center 500 can provide an IP fabric for routing data flows between a source and a destination in accordance with the systems and methods disclosed herein.

The network design of the data center 500 can be based on a layered approach. The layered approach can provide improved scalability, performance, flexibility, resiliency, and maintenance. As shown in FIG. 5A, the layers of the data center 500 can include the core, aggregation, and access layers (i.e., data center core 506, data center aggregation 504, and data center access 502).

The data center core 506 layer provides the high-speed packet switching backplane for all flows going in and out of the data center 500. The data center core 506 can provide connectivity to multiple aggregation modules and provides a resilient Layer 3 routed fabric with no single point of failure. The data center core 506 can run an interior routing protocol, such as Open Shortest Path First (OSPF) or Enhanced Interior Gateway Routing Protocol (EIGRP), and load balances traffic between the campus core and aggregation layers using forwarding-based hashing algorithms, for example.

The data center aggregation 504 layer can provide functions such as service module integration, Layer 2 domain definitions, spanning tree processing, and default gateway redundancy. Server-to-server multi-tier traffic can flow through the aggregation layer and can use services, such as firewall and server load balancing, to optimize and secure applications. The smaller icons within the aggregation layer switch in FIG. 5A represents the integrated service modules. These modules provide services, such as content switching, firewall, SSL offload, intrusion detection, network analysis, and more.

The data center access 502 layer is where the servers physically attach to the network. The server components can be, e.g., 1RU servers, blade servers with integral switches, blade servers with pass-through cabling, clustered servers, and mainframes with OSA adapters. The access layer network infrastructure can include modular switches, fixed configuration 1 or 2RU switches, and integral blade server switches. Switches provide both Layer 2 and Layer 3 topologies, fulfilling the various server broadcast domain or administrative requirements.

The architecture in FIG. 5A is an example of a multi-tier data center, but server cluster data centers can also be used. The multi-tier approach can include web, application, and database tiers of servers. The multi-tier model can use software that runs as separate processes on the same machine using interprocess communication (IPC), or the multi-tier model can use software that runs on different machines with communications over the network. Typically, the following three tiers are used: (i) Web-server; (ii) Application; and (iii) Database. Further, multi-tier server farms built with processes running on separate machines can provide improved resiliency and security. Resiliency is improved because a server can be taken out of service while the same function is still provided by another server belonging to the same application tier. Security is improved. For example, an attacker can compromise a web server without gaining access to the application or database servers. Web and application servers can coexist on a common physical server, but the database typically remains separate. Load balancing the network traffic among the tiers can provide resiliency, and security is achieved by placing firewalls between the tiers. Additionally, segregation between the tiers can be achieved by deploying a separate infrastructure composed of aggregation and access switches, or by using virtual local area networks (VLANs). Further, physical segregation can improve performance because each tier of servers is connected to dedicated hardware. The advantage of using logical segregation with VLANs is the reduced complexity of the server farm. The choice of physical segregation or logical segregation depends on your specific network performance requirements and traffic patterns.

The data center access 502 includes one or more access server clusters 508, which can include layer 2 access with clustering and NIC teaming. The access server clusters 508 can be connected via gigabit ethernet (GigE) connections 510 to the workgroup switches 512. The access layer provides the physical level attachment to the server resources and operates in Layer 2 or Layer 3 modes for meeting particular server requirements such as NIC teaming, clustering, and broadcast containment.

The data center aggregation 504 can include aggregation processor 520, which is connected via 10 gigabit ethernet (10 GigE) connections 514 to the data center access 502 layer.

The aggregation layer can be responsible for aggregating the thousands of sessions leaving and entering the data center. The aggregation switches can support, e.g., many 10 GigE and GigE interconnects while providing a high-speed switching fabric with a high forwarding rate. The aggregation processor 520 can provide value-added services, such as server load balancing, firewalling, and SSL offloading to the servers across the access layer switches. The switches of the aggregation processor 520 can carry the workload of spanning tree processing and default gateway redundancy protocol processing.

For an enterprise data center, the data center aggregation 504 can contain at least one data center aggregation module that includes two switches (i.e., aggregation processors 520). The aggregation switch pairs work together to provide redundancy and to maintain the session state. For example, the platforms for the aggregation layer include the CISCO CATALYST 6509 and CISCO CATALYST 6513 switches equipped with SUP720 processor modules. The high switching rate, large switch fabric, and ability to support a large number of 10 GigE ports are important requirements in the aggregation layer. The aggregation processors 520 can also support security and application devices and services, including, e.g.: (i) Cisco Firewall Services Modules (FWSM); (ii) Cisco Application Control Engine (ACE); (iii) Intrusion Detection; (iv) Network Analysis Module (NAM); and (v) Distributed denial-of-service attack protection.

The data center core 506 provides a fabric for high-speed packet switching between multiple aggregation modules. This layer serves as the gateway to the campus core 516 where other modules connect, including, for example, the extranet, wide area network (WAN), and internet edge. Links connecting the data center core 506 can be terminated at Layer 3 and use 10 GigE interfaces to support a high level of throughput, performance, and to meet oversubscription levels. According to certain non-limiting examples, the data center core 506 is distinct from the campus core 516 layer, with different purposes and responsibilities. A data center core is not necessarily required, but is recommended when multiple aggregation modules are used for scalability. Even when a small number of aggregation modules are used, it might be appropriate to use the campus core for connecting the data center fabric.

The data center core 506 layer can connect, e.g., to the campus core 516 and data center aggregation 504 layers using Layer 3-terminated 10 GigE links. Layer 3 links can be used to achieve bandwidth scalability, quick convergence, and to avoid path blocking or the risk of uncontrollable broadcast issues related to extending Layer 2 domains.

The traffic flow in the core can include sessions traveling between the campus core 516 and the aggregation processors 520. The data center core 506 aggregates the aggregation module traffic flows onto optimal paths to the campus core 516. Server-to-server traffic can remain within an aggregation processor 520, but backup and replication traffic can travel between aggregation processors 520 by way of the data center core 506.

Figure 5B:
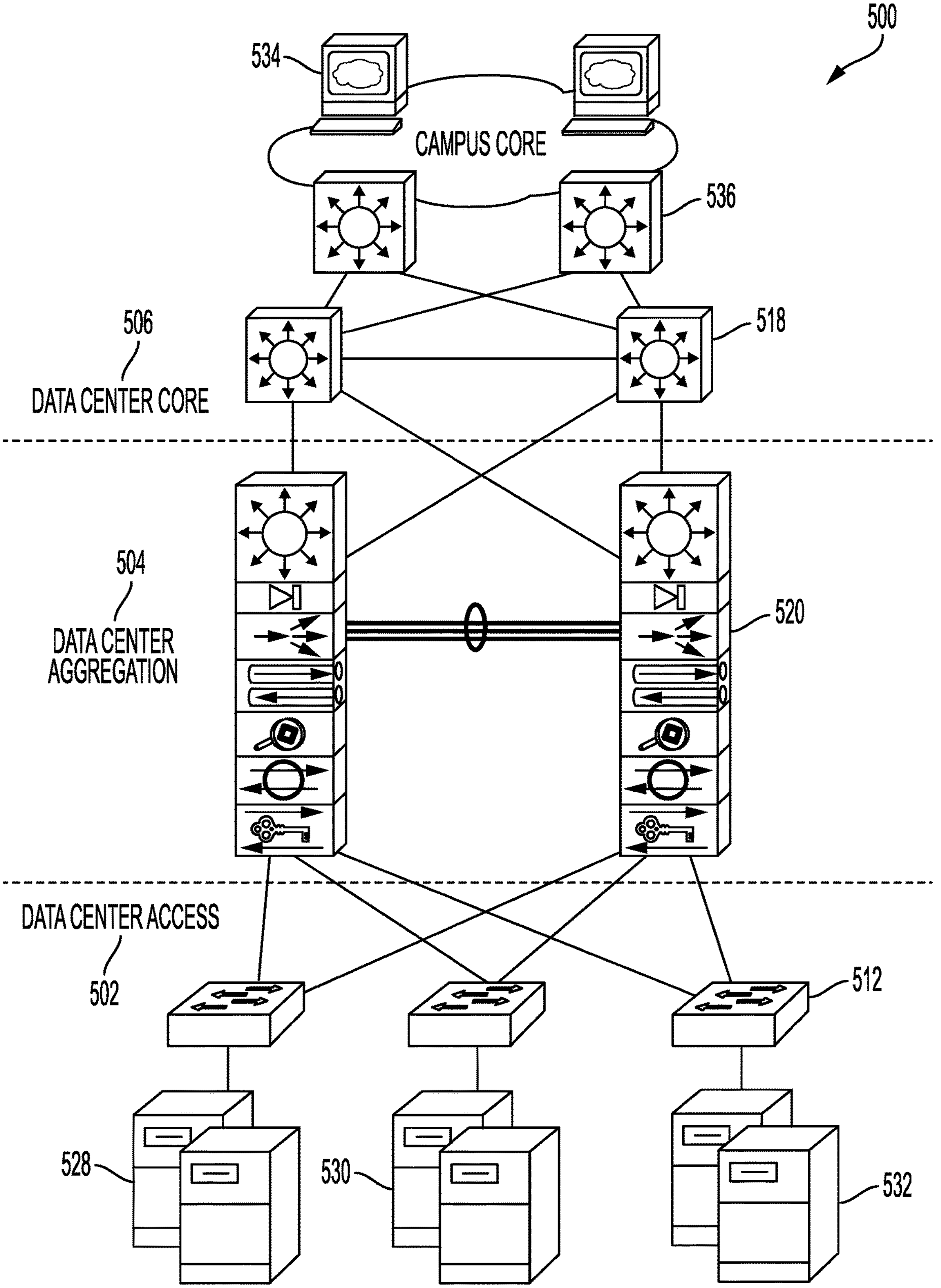
FIG. 5B illustrates a block diagram of an example of a network having respective servers (e.g., a web server, an application server, and a database server) in the access layer, in accordance with some embodiments.

FIG. 5B illustrates other aspects of the data center 500. The connections among the multilayer switches 518 and the other multilayer switches 536 enable traffic flow in the data center core to the clients 534 in the campus core 516. The data center core 506 can connect to the campus core 516 and data center aggregation 504 layer using Layer 3-terminated 10 GigE links. Layer 3 links can be used to achieve bandwidth scalability, quick convergence, and to avoid path blocking or the risk of uncontrollable broadcast issues related to extending Layer 2 domains.

According to certain non-limiting examples, the traffic flow in the core consists primarily of sessions traveling between the campus core and the aggregation modules. The core aggregates the aggregation module traffic flows onto optimal paths to the campus core.

The traffic in the data center aggregation 504 layer primarily can include core layer to access layer flows. The core-to-access traffic flows can be associated with client HTTP-based requests to the web servers 528, the application servers 530, and the database servers 532. At least two equal cost routes exist to the web server subnets. The CISCO Express Forwarding (CEF)-based L3 plus L4 hashing algorithm determines how sessions balance across the equal cost paths. The web sessions might initially be directed to a VIP address that resides on a load balancer in the aggregation layer, or sent directly to the server farm. After the client request goes through the load balancer, it might then be directed to an SSL offload module or a transparent firewall before continuing to the actual server residing in the data center access 502.

Figure 6A:
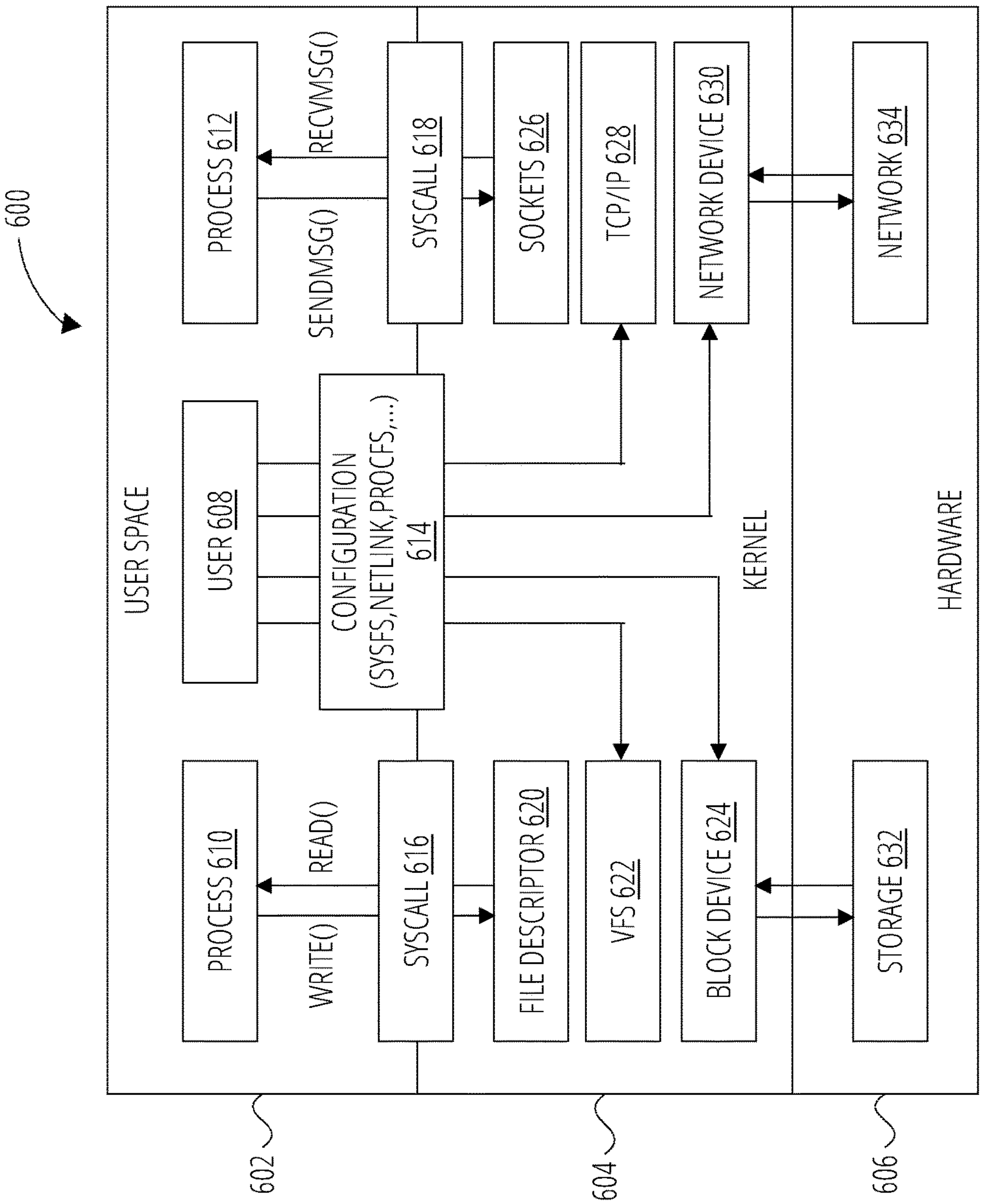
FIG. 6A illustrates an example of a block diagram of an extended Berkley packet filter (eBPF), in accordance with some embodiments.

FIG. 6A illustrates a non-limiting example of implementing extended Berkley pack filters (eBPF). The eBPF architecture 600 can be implemented on a central processing unit (CPU and includes a user space 602, kernel 604, and hardware 606. For example, the user space 602 can be a place where regular applications run, whereas the kernel 604 is where most operating system-related processes run. An eBPF in a processor at a node (e.g., a server or router) of the network can be used to apply security service and generate network data including program traces and data the types of system calls to the kernel 604. This network data can be used to generate in-band information and out-of-band information that provides the security service context for which security services have been applied to a data flow at the respective nodes within a network.

The kernel 604 can have direct and full access to the hardware 606. When a given application in user space 602 connects to hardware 606, the application can do so via calling APIs in kernel 604. Separating the application and the hardware 606 can provide security benefits. An eBPF can allow user-space applications to package the logic to be executed in the kernel 604 without changing the kernel code or reloading.

Since eBPF programs run in the kernel 604, the eBPF programs can have visibility across all processes and applications, and, therefore, they can be used for many things: network performance, security, tracing, and firewalls.

The user space 602 can include a process 610, a user 608, and process 612. The kernel 604 can include a file descriptor 620, a virtual file system (VFS) 622, a block device 624, sockets 626, a TCP/IP 628, and a network device 630. The hardware 606 can include storage 632 and network 634.

eBPF programs are event-driven and are run when the kernel or an application passes a certain hook point. Predefined hooks include system calls, function entry/exit, kernel tracepoints, network events, and several others. If a predefined hook does not exist for a particular need, it is possible to create a kernel probe (kprobe) or user probe (uprobe) to attach eBPF programs almost anywhere in kernel or user applications. When the desired hook has been identified, the eBPF program can be loaded into the kernel 604 using the bpf system call (e.g., syscall 616 or syscall 618). This is typically done using one of the available eBPF libraries. The next section provides an introduction into the available development toolchains. Verification of the eBPF program ensures that the eBPF program is safe to run. It validates that the program meets several conditions (e.g., the conditions can be that the process loading the eBPF program holds the required capabilities/privileges; the program does not crash or otherwise harm the system; and the program always runs to completion).

A benefit of the kernel 604 is abstracting the hardware (or virtual hardware) and providing a consistent API (system calls) allowing for applications to run and share the resources. To achieve this, a wide set of subsystems and layers are maintained to distribute these responsibilities. Each subsystem can allow for some level of configuration (e.g., configuration 614) to account for different needs of users. Each subsystem can allow for some level of configuration to account for the different needs of users. When a desired behavior cannot be configured, the kernel 604 can be modified to perform the desired behavior. This modification can be realized in three different ways: (1) by changing kernel source code, which may take a long time (e.g., several years) before a new kernel version becomes available with the desired functionality; (2) writing a kernel module, which may require regular editing (e.g., every kernel release) and incurs the added risk of corrupting the kernel 604 due to lack of security boundaries; or (3) writing an eBPF program that realizes the desired functionality. Beneficially, eBPF allows for reprogramming the behavior of the kernel 604 without requiring changes to kernel source code or loading a kernel module.

Many types of eBPF programs can be used, including socket filters and system call filters, networking, and tracing. Socket filter type eBPF programs can be used for network traffic filtering, and can be used for discarding or trimming of packets based on the return value. XDP type eBPF programs can be used to improve packet processing performance by providing a hook closer to the hardware (at the driver level), e.g., to access a packet before the operative system creates metadata. Tracepoint type eBPF programs can be used instrument kernel code, e.g., by attaching an eBPF program when a "perf" event is opened with a command "perf_event_open(2)", then use the command "ioctl(2)" to return a file descriptor that can be used to enable the associated individual event or event group and to attach the eBPF program to the tracepoint event. Helper type eBPF programs can be used to determines which subset of in kernel functions can be called. Helper functions are called from within eBPF programs to interact with the system, to operate on the data passed as context, or to interact with maps.

Figure 6B:
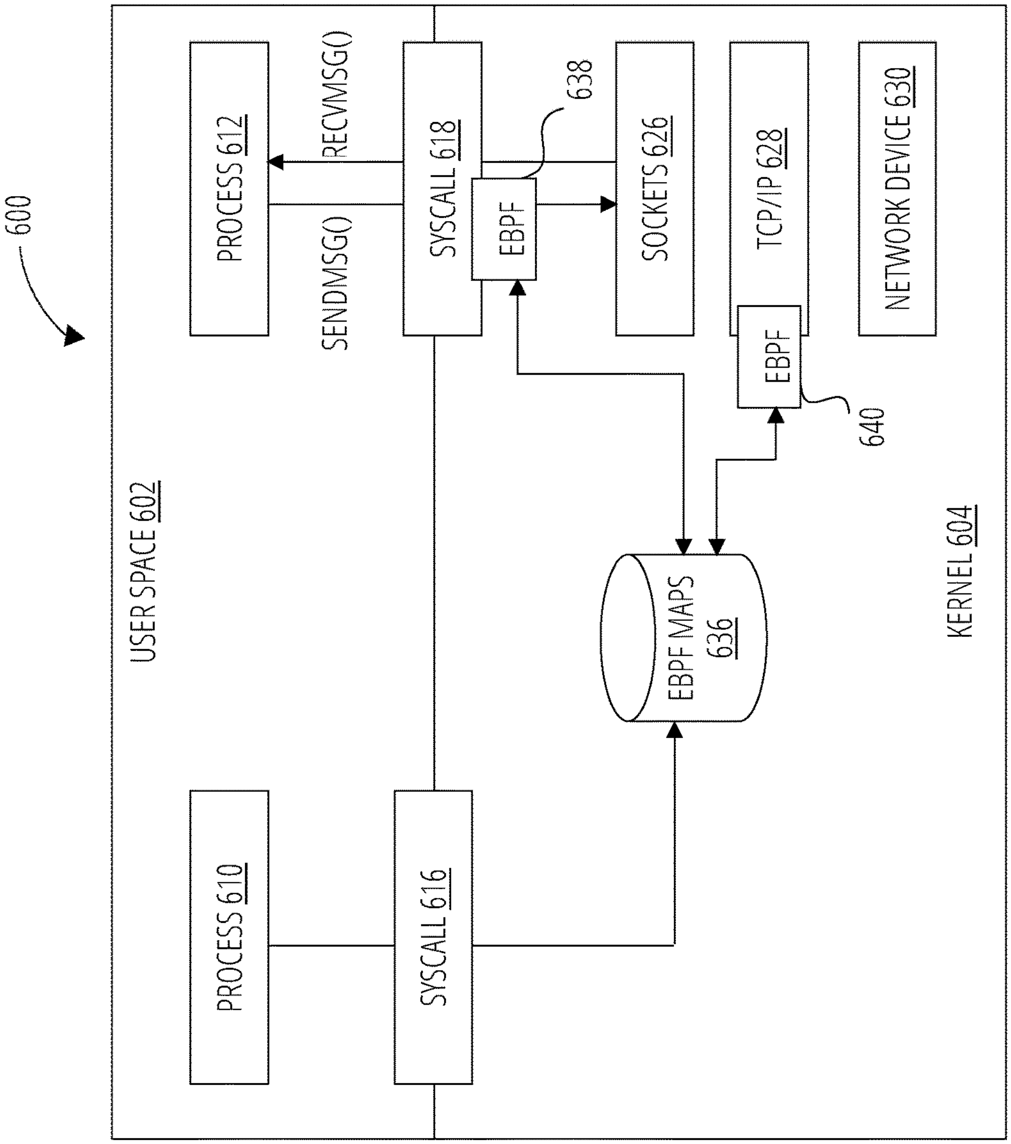
FIG. 6B illustrates an example of a block diagram of an eBPF map in an eBPF, in accordance with some embodiments.

FIG. 6B illustrates just-in-time (JIT) compilation of eBPF programs. JIT compilation translates the generic bytecode of the program into the machine specific instruction set to optimize execution speed of the program. This makes eBPF programs run as efficiently as natively compiled kernel code or as code loaded as a kernel module.

An aspect of eBPF programs is the ability to share collected information and to store state information. For example, eBPF programs can leverage eBPF maps 636 to store and retrieve data in a wide set of data structures. The eBPF maps 636 can be accessed from eBPF program 638 and eBPF program 640 as well as from applications (e.g., process 610 and process 612) in user space 602 via a system call (e.g., syscall 616 and syscall 618). Non-limiting examples of supported map types include, e.g., hash tables, arrays, least recently used (LRU), ring buffer, stack trace, and longest prefix match (LPM), which illustrates the diversity of data structures supported by eBPF programs.

Figure 7:
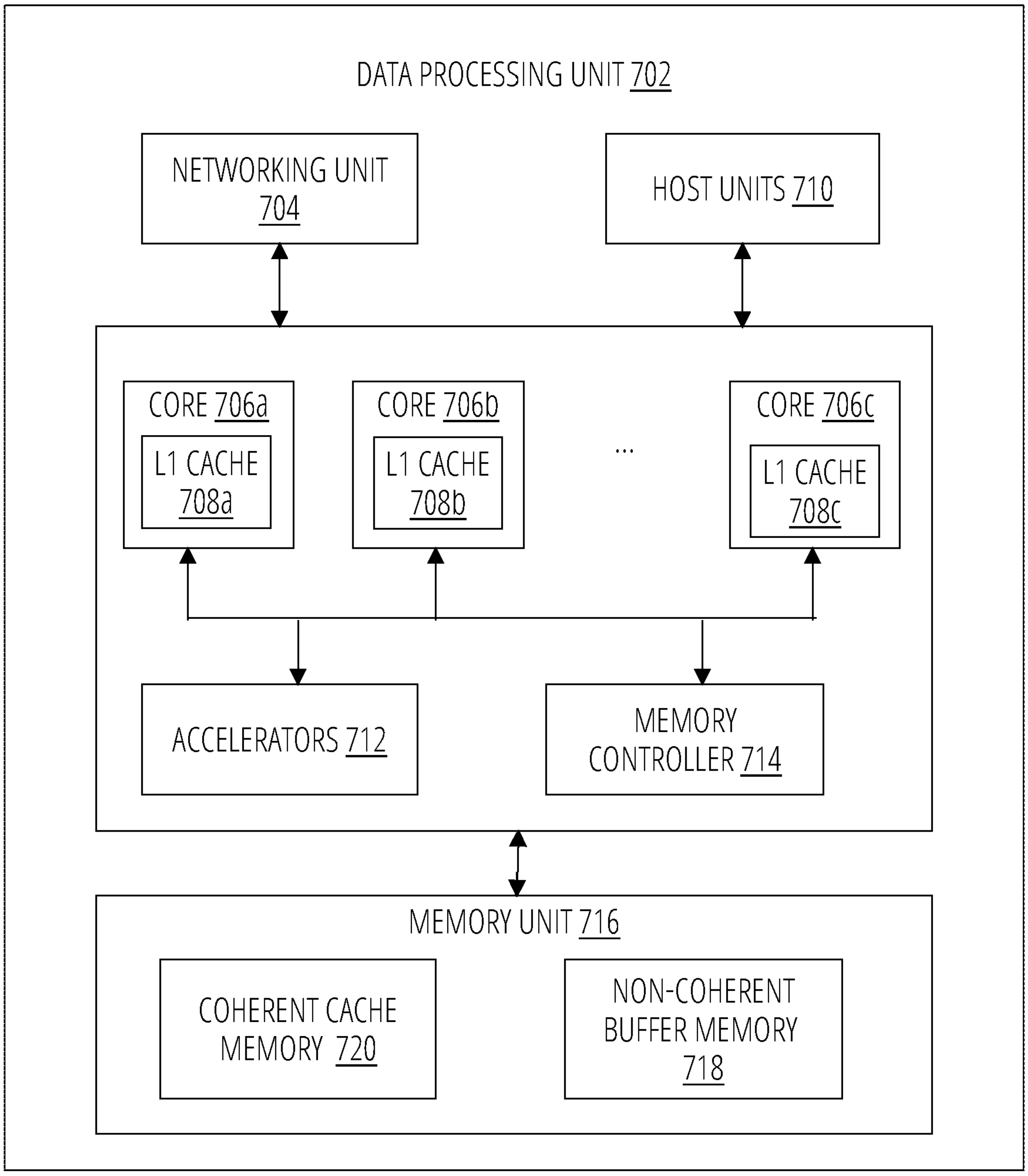
FIG. 7 illustrates an example of a block diagram of a data processing unit (DPU), in accordance with some embodiments.

A non-limiting example of a data processing unit (DPU) 702 is illustrated in FIG. 7. The DPU 702 can include two or more processing cores, for example. DPU 702 can be a hardware chip that is implemented in digital logic circuitry and can be used in any computing or network device. The DPU 702 can be used to generate in-band information and out-of-band information that provides security service context for which security services have been applied to a data flow at the respective nodes within a network.

DPU 702 can receive and transmit data packets via networking unit 704, which can be configured to function as an ingress port and egress port, enabling communications with one or more network devices, server devices (e.g., servers), random access memory, storage media (e.g., solid state drives (SSDs)), storage devices, or a data center fabric. The ports can include, e.g., a PCI-e port, Ethernet (wired or wireless) port, or other such communication media. Additionally or alternatively, DPU 702 can be implemented as an application-specific integrated circuit (ASIC), can be configurable to operate as a component of a network appliance or can be integrated with another DPUs within a device.

In FIG. 7, for example, DPU 702 can include a plurality of programmable processing core 706*a*, core 706*b*, . . . , core 706*c* (collectively referred to as "cores 706") and each of the cores 706 can include an L1 cache (e.g., L1 cache 708*a*, L1 cache 708*b*, . . . , L1 cache 708*c*). DPU 702 can include a memory unit 716. Memory unit 716 can include different types of memory or memory devices (e.g., coherent cache memory 720 and non-coherent buffer memory 718). In some examples, plurality of cores 706 can include at least two processing cores. DPU 702 also includes a networking unit 704, one or more host units 710, a memory controller 714, and one or more accelerators 712. Each of the cores 706, networking unit 704, memory controller 714, host units 710, accelerators 712, and memory unit 716 including coherent cache memory 720 and non-coherent buffer memory 718 can be connected to allow communication therebetween.

Cores 706 can comprise one or more of MIPS (microprocessor without interlocked pipeline stages) cores, ARM (advanced RISC (reduced instruction set computing) machine) cores, PowerPC (performance optimization with enhanced RISC-performance computing) cores, RISC-V (RISC five) cores, or CISC (complex instruction set computing or x86) cores. Each of cores 706 can be programmed to process one or more events or activities related to a given data packet such as, For example, a networking packet or a storage packet. Each of cores 706 can be programmable using a high-level programming language, e.g., C or C++.

The use of DPUs 702 can be beneficial for network processing of data flows. In some examples, the plurality of cores 706 can be capable of processing data packets received by networking unit 704 and/or host units 710, in a sequential manner using one or more "work units." In general, work units are sets of data exchanged between cores 706 and networking unit 704 and/or host units 710.

Memory controller 714 can control access to memory unit 716 by cores 706, networking unit 704, and any number of external devices, e.g., network devices, servers, or external storage devices. Memory controller 714 can be configured to perform a number of operations to perform memory management in accordance with the present disclosure. In some examples, memory controller 714 can be capable of mapping a virtual address to a physical address for non-coherent buffer memory 718 by performing a number of operations. In some examples, memory controller 714 can be capable of transferring ownership of a cache segment of the plurality of segments from first core 706*a* to second core 706*b* by performing a number of operations.

DPU 702 can act as a combination of a switch/router and a number of network interface cards. For example, networking unit 704 can be configured to receive one or more data packets from and transmit one or more data packets to one or more external devices, e.g., network devices. Networking unit 704 can perform network interface card functionality, and packet switching.

Additionally or alternatively, networking unit 704 can be configured to use large forwarding tables and offer programmability. Networking unit 704 can advertise Ethernet ports for connectivity to a network. In this way, DPU 702 supports one or more high-speed network interfaces, e.g., Ethernet ports, without the need for a separate network interface card (NIC). Each of host units 710 can support one or more host interfaces, e.g., PCI-e ports, for connectivity to an application processor (e.g., an x86 processor of a server device or a local CPU or GPU of the device hosting DPU 702) or a storage device (e.g., an SSD). DPU 702 can also include one or more high bandwidth interfaces for connectivity to off-chip external memory (not illustrated in FIG. 7). Each of accelerators 712 can be configured to perform acceleration for various data-processing functions, such as look-ups, matrix multiplication, cryptography, compression, or regular expressions. For example, accelerators 712 can comprise hardware implementations of look-up engines, matrix multipliers, cryptographic engines, compression engines, or regular expression interpreters.

DPU 702 can improve efficiency over x86 processors for targeted use cases, such as storage and networking input/output, security and network function virtualization (NFV), accelerated protocols, and as a software platform for certain applications (e.g., storage, security, and data ingestion). DPU 702 can provide storage aggregation (e.g., providing direct network access to flash memory, such as SSDs) and protocol acceleration. DPU 702 provides a programmable platform for storage virtualization and abstraction. DPU 702 can also perform firewall and address translation (NAT) processing, stateful deep packet inspection, and cryptography. The accelerated protocols can include TCP, UDP, TLS, IPSec (e.g., accelerates AES variants, SHA, and PKC), RDMA, and iSCSI. DPU 702 can also provide quality of service (QoS) and isolation containers for data and provide LLVM binaries.

DPU 702 can support software including network protocol offload (TCP/IP acceleration, RDMA and RPC); initiator and target side storage (block and file protocols); high level (stream) application APIs (compute, network and storage (regions)); fine grain load balancing, traffic management, and QoS; network virtualization and network function virtualization (NFV); and firewall, security, deep packet inspection (DPI), and/or encryption (IPsec, SSL/TLS).

Figure 8:
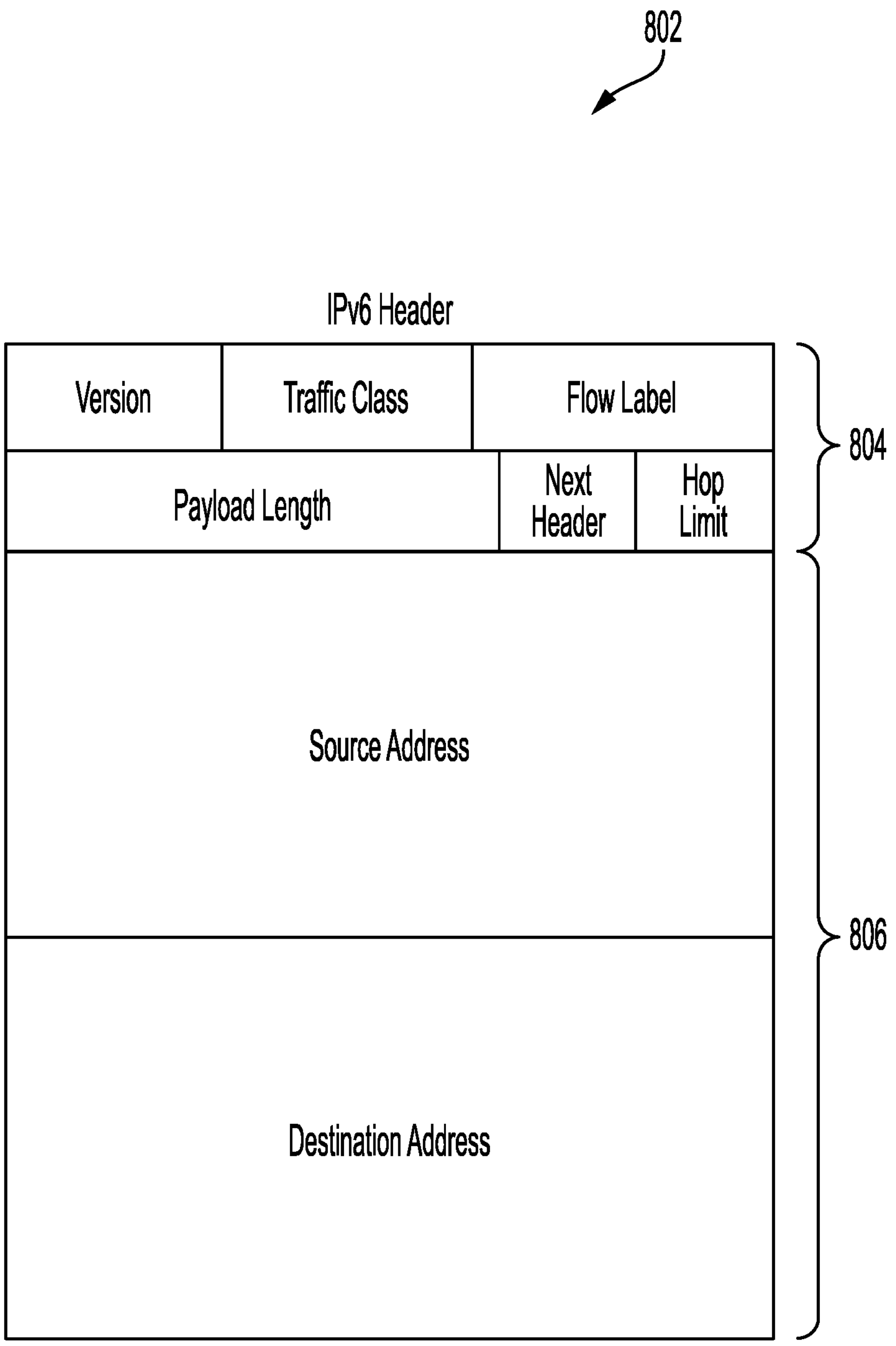
FIG. 8 illustrates an example of an IPv6 main header, in accordance with some embodiments.

FIG. 8 illustrates an Internet Protocol version 6 (IPv6) main header 802 for an IPv6 data packet, which is the smallest message entity exchanged using Internet Protocol version 6 (IPv6). Packets include headers 802 that have control information 804 and addressing information 806 for routing, and the packets include a payload of user data. The control information in IPv6 packets is subdivided into a mandatory fixed header (e.g., the main header 802) and optional extension headers. The payload of an IPv6 packet can be a datagram or segment of the higher-level transport layer protocol. Additionally or alternatively, the payload of an IPv6 packet can be data for an internet layer (e.g., ICMPv6) or link layer (e.g., OSPF) instead.

IPv6 packets can be transmitted over the link layer (i.e., over Ethernet or Wi-Fi), which encapsulates each packet in a frame. Packets may also be transported over a higher-layer tunneling protocol, such as IPv4 when using 6 to 4 or Teredo transition technologies, for example.

Routers do not fragment IPv6 packets larger than the maximum transmission unit (MTU). A minimum MTU of 1,280 octets is used by IPv6. Hosts are recommended to use Path MTU Discovery to take advantage of MTUs greater than the minimum.

IPv6 is uses two distinct types of headers: (i) main header 802 and IPv6 Extension Headers. For example, the main header 802 can be similar to the basic IPv4 header despite some field differences that are the result of lessons learned from operating IPv4.

In the main header, the field "Ver" can be a 4-bit Internet Protocol version number; the field "Traffic Class" can be a 8-bit traffic class field; the field "Flow Label" can be a 20-bit flow label. See section 6; the field "Payload Length" can be a 16-bit unsigned integer (e.g., this field can be the length of the IPv6 payload, representing the rest of the packet following this IPv6 header, in octets); the field "Next Header" can be a 16 8-bit selector. Identifies the type of header immediately following the IPv6 header; the field "Hop Limit" can be a 8-bit unsigned integer (e.g., this field can be decremented by 1 by each node that forwards the packet, and the packet is discarded if Hop Limit is decremented to zero); the field "Source Address" can be a 128-bit address of the originator of the packet; the field "Destination Address" can be a 128-bit address of the intended recipient of the packet.

Figure 9A:
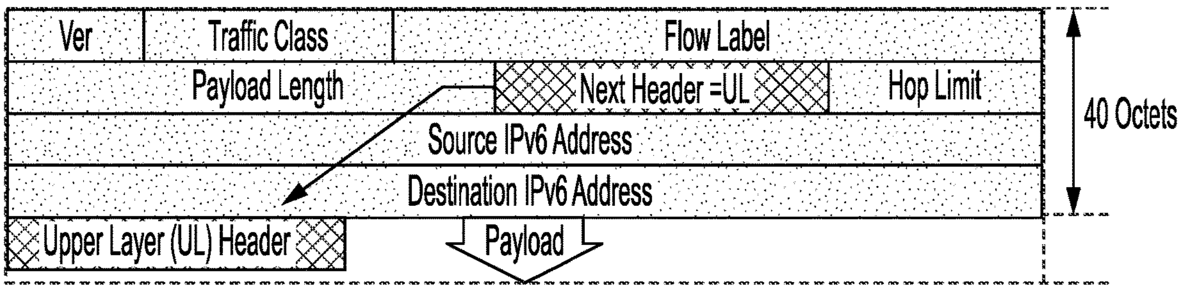
FIG. 9A illustrates an example of an IPv6 header, in accordance with some embodiments.
Figure 9B:
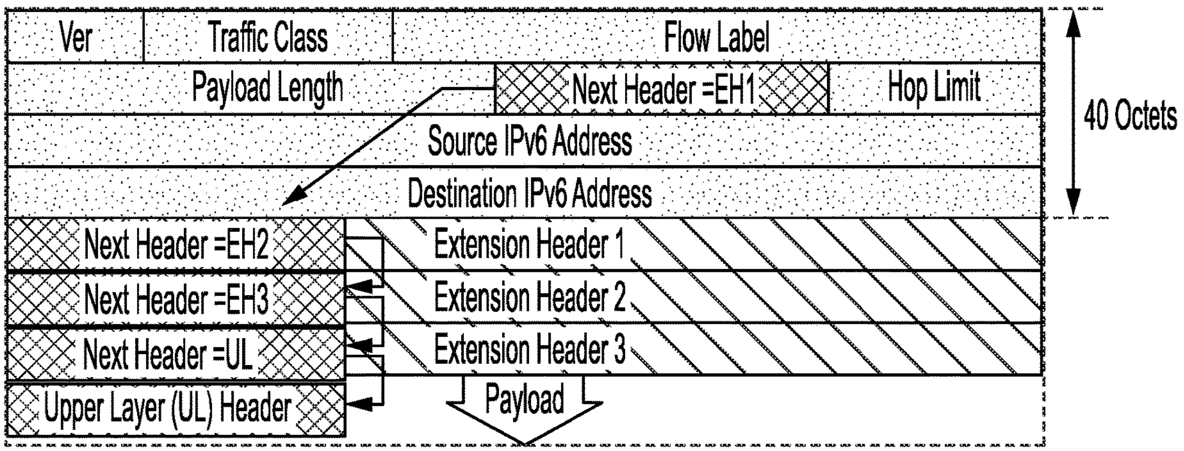
FIG. 9B illustrates an example of an IPv6 header with an optional extension header, in accordance with some embodiments.

FIG. 9A and FIG. 9B illustrate chaining extension headers (EHs) in IPv6. The main header 802 remains fixed in size (40 bytes) while customized EHs are added as needed. FIG. 9A and FIG. 9B show how the headers are linked together in an IPv6 packet. RFC 2460, which is hereby incorporated by reference in its entirety, defines the extension headers, as shown in FIG. 9C, along with the Next Header values assigned to them.

In IPv6, optional internet-layer information is encoded in separate headers that may be placed between the IPv6 header and the upper-layer header in a packet. There are a small number of such extension headers, each identified by a distinct Next Header value. An IPv6 packet may carry zero, one, or more extension headers, each identified by the Next Header field of the preceding header.

Extension headers are an intrinsic part of the IPv6 protocol and they support some basic functions and certain services. FIG. 9C shows various extension headers (EHs). Now, descriptions are provided of various circumstances where some of these EHs can be used. The Hop-by-Hop EH can be used for the support of Jumbo-grams. Additionally or alternatively, when used with the Router Alert option, the Hop-by-Hop EH can be integrated in the operation of Multicast Listener Discovery (MLD). For example, Router Alert is an integral part in the operations of IPv6 Multicast through Multicast Listener Discovery (MLD) and RSVP for IPv6. The Destination EH can be used in IPv6 Mobility as well as support of certain applications. Routing EH can be used in IPv6 Mobility and in Source Routing. It may be necessary to disable "IPv6 source routing" on routers to protect against distributed denial-of-service (DDOS) attacks. The Fragmentation EH can be used to support communications using fragmented packets (in IPv6. The Mobility EH can be used in support of Mobile IPv6 service. The Authentication EH can be used in a similar format to the IPv4 authentication header, which is defined in RFC 2402, which is hereby incorporated by reference in its entirety. The Encapsulating Security Payload EH is similar in format and use to the IPv4 ESP header defined in RFC2406, which is hereby incorporated by reference in its entirety. The information following the Encapsulating Security Header (ESH) is encrypted, accordingly, the information following the ESH is inaccessible to intermediary network devices. The ESH can be followed by an additional Destination Options EH and the upper layer datagram.

Figure 10A:
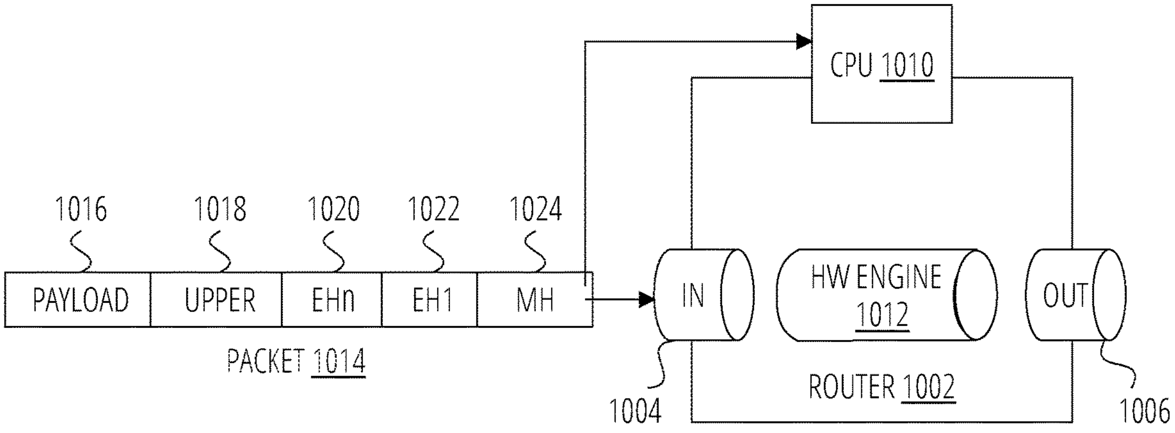
FIG. 10A illustrates a first example of routing IPv6 packets through a router, in accordance with some embodiments.
Figure 10B:
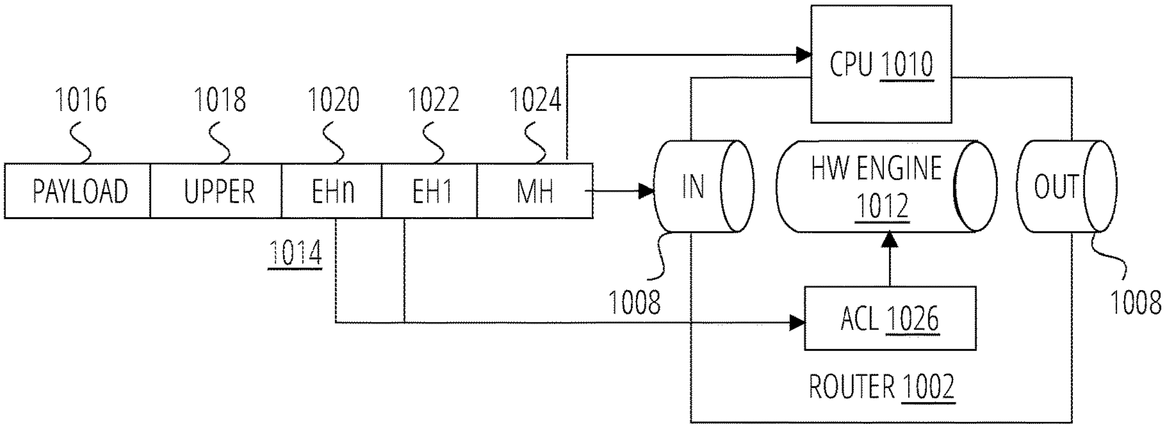
FIG. 10B illustrates a second example of routing IPv6 packets through a router, in accordance with some embodiments.
Figure 10C:
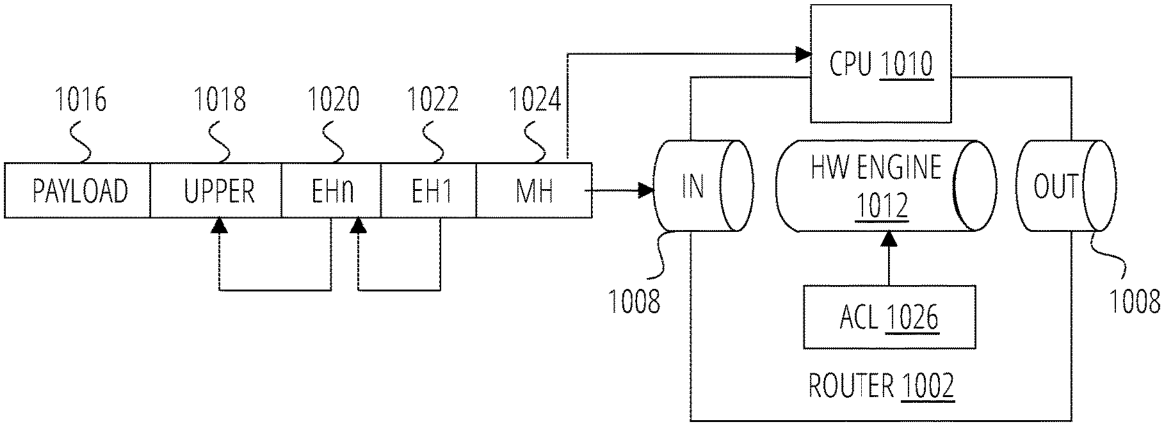
FIG. 10C illustrates a third example of routing IPv6 packets through a router, in accordance with some embodiments.

FIG. 10A through FIG. 10C illustrate the way in which various Extension Header types can be processed by network devices under basic forwarding conditions or in the context of advanced features such as Access Lists. It identifies the protocol requirements that must be observed. In FIG. 10A, the Hop-by-Hop Extension Header is the only EH that is fully processed by all network devices. From this perspective, the Hop-by-Hop EH is similar to the IPv4 options. Because the Hop-by-Hop EH is fully processed, it is handled by the CPU 1010 and the IPv6 traffic that contains a Hop-by-Hop EH will go through a slow forwarding path. This rule applies to all vendors. Hardware forwarding (e.g., hardware (HW) engine 1012) is not used in this case.

The packet 1014 can include a payload 1016, an upper layer 1018, a series of extension headers (e.g., extension header 1 1022, . . . , extension header n 1020), and a main header 1024. The packets are received by an ingress port 1004 of the router 1002, and then processed/forward by either a hardware (HW) engine 1012 or a CPUs 1010, depending on the structure of the data packet 1014.

Network devices are not required to process any of the other IPv6 extension headers when simply forwarding the traffic. For this reason, IPv6 traffic with one or more EHs other than Hop-by-Hop can be forwarded using the HW engine 1012. Network devices might, however, process some EHs if specifically configured to do so while supporting certain services such as IPv6 Mobility.

For example, the extension headers used to secure the IP communication between two hosts, Authentication and Encapsulating Security Payload Headers, are also ignored by the intermediary network devices while forwarding traffic. These EHs are relevant only to the source and destination of the IP packet. It is important however to remember that all information following the ESH is encrypted and not available for inspection by an intermediary device, if that is required.

FIG. 10B illustrates a non-limiting example of processing data packets using an access list 1026. Here, IPv6 packet 1014 is forwarded using extension headers other than Hop-by-Hop with ACLs filtering based on EH type. The CPU 1010 can see the information in the main header and the access list 1026 can use the EH type information in the extension header 1 1022 and extension header n 1020, for example.

Consider that, in the absence of the Hop-by-Hop EHs, as long as a router is concerned exclusively with layer 3 (L3) information and it is not specifically instructed to process certain EH (for certain services it is supporting), it can forward IPv6 traffic without analyzing the extension headers. An IPv6 packet can have an arbitrary number of EH (other than Hop-by-Hop) and the router would ignore them and simply forward the traffic based on the main header. Under these conditions, routers can forward the IPv6 traffic in hardware despite the EHs. Access Lists (ACL) applied on router interfaces however, can change the router's IPv6 forwarding performance characteristics when extension headers are present. To permit or deny certain types of extension headers, routers are configured with the ACL features listed above to filter based on the "Header Type" value. Since this functionality is implemented through ACLs, platforms that support hardware forwarding when ACLs are applied, will be able to handle the IPv6 traffic with EHs in hardware as well.

FIG. 10C illustrates a non-limiting example of processing data packets using forwarding IPv6 packet 1014 with extension headers other than Hop-by-Hop with ACLs filtering based on protocol information of the upper layer 1018. Often, routers filter traffic based on the upper layer protocol information. In these cases, a router processes the main header of the packet as well as the information in its payload. In the absence of extension headers, routers perform these functions on IPv6 traffic in the same way they do on IPv4 traffic, so the traffic can be forwarded in hardware.

In the presence of extension headers (not Hop-by-Hop), the upper layer protocol information is pushed deeper into the payload of the packet, impacting the packet inspection process. In these cases, the router can traverse the chain of headers (main plus extension headers), header by header until it reaches the upper layer protocol header and the information for the filter. The extension headers are not processed, the router simply looks at the "Next Header" value and the length of the EH in order to understand what header follows and the offset to its beginning.

Even though a router might be able to process upper layer protocol ACLs or one EH in hardware, if it was not designed while considering all aspects of IPv6, it might not be able to handle filtering when packets contain both EH and Upper Layer data as in the scenario described above.

Figure 11:
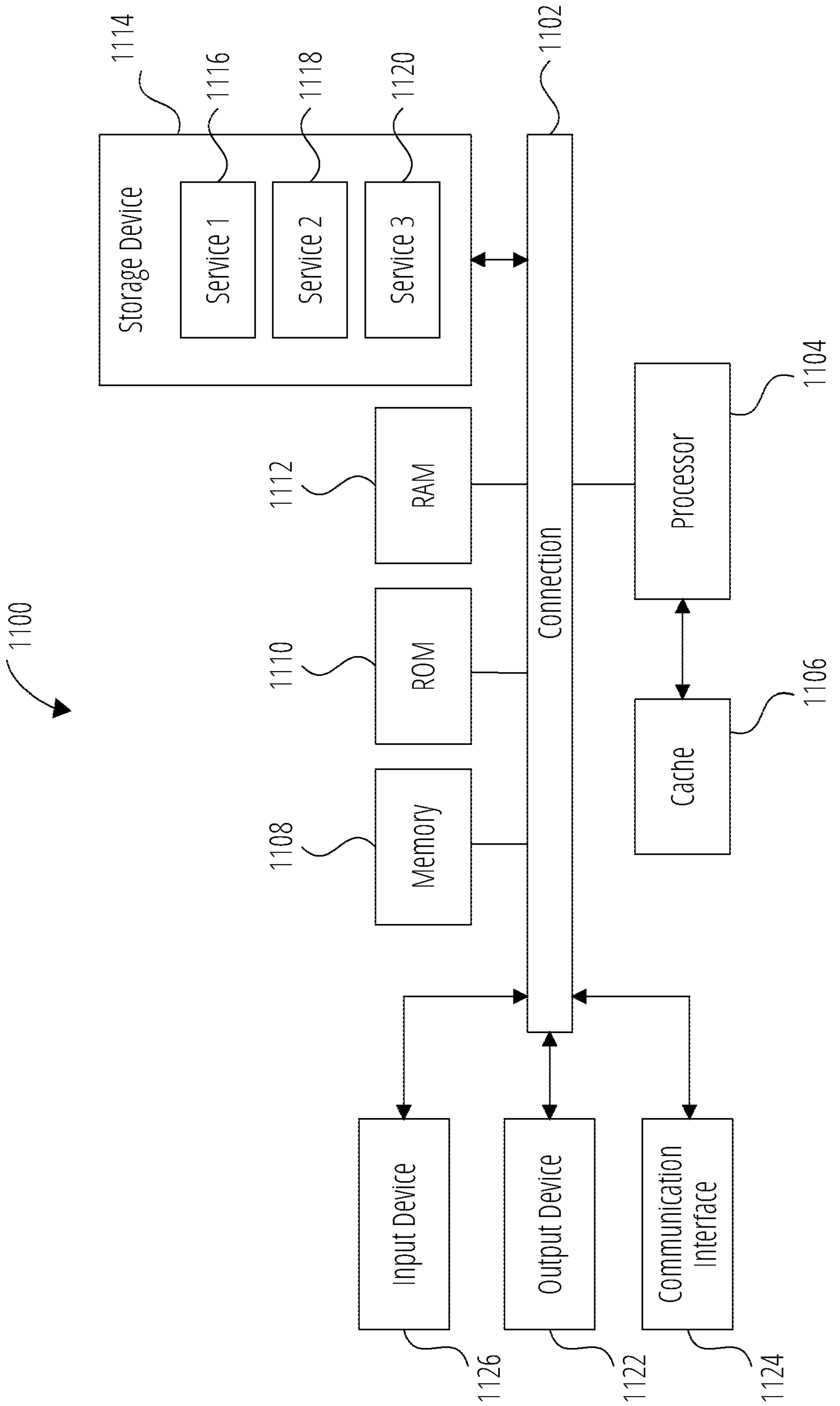
FIG. 11 illustrates a block diagram of an example of a computing device, in accordance with some embodiments.

FIG. 11 shows an example of computing system 1100, which can be for example any computing device making up the internet edge security framework 400, data center 500, system 100, or any component thereof in which the components of the system are in communication with each other using connection 1102. Connection 1102 can be a physical connection via a bus, or a direct connection into processor 1104, such as in a chipset architecture. Connection 1102 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1100 includes at least one processing unit (CPU or processor) processor 1104 and connection 1102 that couples various system components including system memory 1108, such as read-only memory (ROM) 1110 and random access memory (RAM) 1112 to processor 1104. Computing system 1100 can include a cache of high-speed memory cache 1106 connected directly with, in close proximity to, or integrated as part of processor 1104.

Processor 1104 can include any general-purpose processor and a hardware service or software service, such as service 1116, service 1118, and service 1120 stored in storage device 1114, configured to control processor 1104 as well as a special-purpose processor where software instructions are incorporated into the actual processor design. Processor 1104 may essentially be a completely self-contained computing system, containing multiple cores or processors, a bus, memory controller, cache, etc. A multi-core processor may be symmetric or asymmetric.

To enable user interaction, computing system 1100 includes an input device 1126, which can represent any number of input mechanisms, such as a microphone for speech, a touch-sensitive screen for gesture or graphical input, keyboard, mouse, motion input, speech, etc. Computing system 1100 can also include output device 1122, which can be one or more of a number of output mechanisms known to those of skill in the art. In some instances, multimodal systems can enable a user to provide multiple types of input/output to communicate with computing system 1100. Computing system 1100 can include communication interface 1124, which can generally govern and manage the user input and system output. There is no restriction on operating on any particular hardware arrangement, and therefore the basic features here may easily be substituted for improved hardware or firmware arrangements as they are developed.

Storage device 1114 can be a non-volatile memory device and can be a hard disk or other types of computer-readable media that can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1114 can include software services, servers, services, etc., that when the code that defines such software is executed by the processor 1104, it causes the system to perform a function. In some embodiments, a hardware service that performs a particular function can include the software component stored in a computer-readable medium in connection with the necessary hardware components, such as processor 1104, connection 1102, output device 1122, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a network devices and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, For example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special-purpose computer, or special-purpose processing device to perform a certain function or group of functions. Portions of computer resources used can be accessible over a network. The computer executable instructions may be, For example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for adding in-band metadata to data flows, the method comprising:

executing an application on a processor to generate data, the processor being in a source that transmits a data flow comprising the data to a destination via a network;

executing an extended Berkeley packet filter (eBPF) on the processor, the eBPF generating observations of at least the application to obtain runtime behavior of the application based on execution context collected via one or more operating system hook points during execution of the application;

encoding the data in payloads of packets of the data flow, and encoding, in the data flow, dynamic metadata derived from the observations of the application, generated by the eBPF during execution, such that the dynamic metadata represents the observations and is encoded into one or more headers of the packets of the data flow; and signaling instructions to transmit the data flow via the network to the destination.

2. The method of claim 1, further comprising:

receiving the data flow at the destination; and determining, based on the dynamic metadata, a processing step for processing the data flow at the destination, wherein the processing step comprises load balancing, micro-segmentation, and/or policy enforcement.

3. The method of claim 1, wherein the observations are generated by the eBPF that is in a host that executes applications, such that the eBPF generates the observations by observing the application at an application layer (L7) in an open systems interconnection (OSI) hierarchy.

4. The method of claim 1, further comprising:

processing the data flow through a data processing unit (DPU); and generating, at the DPU, additional metadata based on other observations of the processing of the data flow through the DPU, wherein the other observations are at layer 3 (L3) of an OSI hierarchy.

5. The method of claim 4, wherein the additional metadata derived from the other observations of the DPU are encoded in one or more headers of an encapsulation protocol that is selected from a group consisting of generic routing encapsulation (GRE) protocol, generic UDP encapsulation (GUE) protocol, generic network virtualization encapsulation (Geneve) protocol, and a virtual extensible local area network (VXLAN) protocol.

6. The method of claim 4, wherein the additional metadata is generated using another eBPF program operating in a host of the DPU.

7. The method of claim 1, wherein the dynamic metadata from the observations from the eBPF are encoded in headers of Internet protocol (IP) packets.

8. The method of claim 1, wherein the dynamic metadata are encoded in one or more transport layer security (TLS) extension fields.

9. The method of claim 1, wherein the dynamic metadata includes a trust score based on the observations.

10. The method of claim 1, further comprising:

encapsulating the data flow using an encapsulation protocol that encrypts the data flow into an encrypted payload in an encapsulated data flow; and signaling instructions to transmit the encapsulated data flow via a tunnel through the network to the destination.

11. The method of claim 10, wherein encrypting the data flow is performed via DPU offload, and an encryption protocol used for encrypting the data flow is an Internet Protocol Security (IPsec) protocol, Secure Socket Layer (SSL) protocol, or a Transport Layer Security (TLS) protocol.

12. The method of claim 10, wherein the encapsulating of the data flow is performed by a data processing unit (DPU) at a source terminal of the tunnel;

the DPU generates additional metadata based on other observations of the processing of the data flow through the DPU, the DPU encoding the additional metadata in headers of the encapsulated data flow, wherein the other observations are at layer 3 (L3) of an open systems interconnection (OSI) hierarchy; and the additional metadata provides a signal to another DPU at a destination end of the tunnel whether to drop the data flow before reaching a workload at the destination.

13. The method of claim 1, wherein the dynamic metadata includes indicia of one or more identities comprising: (i) an identity of the application, (ii) an identity of a user of the application, and/or (iii) an identity of a source of data being processed by the application, (iv) a location of the processor, and/or (v) a destination address.

14. A computing apparatus comprising:

a processor, the processor being in a source that transmits a data flow comprising data to a destination via a network; and a memory storing instructions that, when executed by the processor, configure the computing apparatus to:

execute an application on the processor to generate data;

execute an extended Berkeley packet filter (eBPF) on the processor, the eBPF generating observations of at least the application to obtain runtime behavior of the application based on execution context collected via one or more operating system hook points during execution of the application;

encode the data in payloads of packets of the data flow, and encoding, in the data flow, dynamic metadata derived from the observations generated by the eBPF during execution, such that the dynamic metadata represents the observations and is encoded into one or more headers of the packets of the data flow; and signal instructions to transmit the data flow via the network to the destination.

15. The computing apparatus of claim 14, wherein, when executed by the processor, the instructions further configure the computing apparatus to:

receive the data flow at the destination; and determine, based on the dynamic metadata, a processing step for processing the data flow at the destination.

16. The computing apparatus of claim 14, wherein the observations are generated by the eBPF that is in a host that executes applications, such that the eBPF generates the observations by observing the application at an application layer (L7) in an open systems interconnection (OSI) hierarchy.

17. The computing apparatus of claim 16, when executed by the processor, the instructions further configure the apparatus to:

process the data flow through a data processing unit (DPU); and generate, at the DPU, additional metadata based on other observations of the processing of the data flow through the DPU, wherein the other observations are at layer 3 (L3) of an OSI hierarchy, and the additional metadata derived from the other observations of the DPU are encoded in one or more headers of an encapsulation protocol.

18. The computing apparatus of claim 14, wherein the dynamic metadata from the observations from the eBPF are encoded in optional Internet protocol version 6 (IPv6) extension headers.

19. The computing apparatus of claim 14, wherein, when executed by the processor, the instructions further configure the computing apparatus to:

encapsulate the data flow by a data processing unit (DPU) at a source terminal of a tunnel using an encapsulation protocol that encrypts the data flow into an encrypted payload in an encapsulated data flow;

the DPU generates additional metadata based on other observations of the processing of the data flow through the DPU, the DPU encoding the additional metadata in headers of the encapsulated data flow, wherein the other observations are at layer 3 (L3) of an open systems interconnection (OSI) hierarchy; and signal instructions to transmit the encapsulated data flow via the tunnel through the network to the destination, wherein the additional metadata provides a signal to another DPU at a destination end of the tunnel whether to drop the data flow before reaching a workload at the destination.

20. A non-transitory computer-readable storage medium, the non-transitory computer-readable storage medium including instructions that when executed by a computer, cause the computer to:

execute an application on a processor to generate data, the processor being in a source that transmits a data flow comprising the data to a destination via a network;

execute an extended Berkeley packet filter (eBPF) on the processor, the eBPF generating observations of at least the application to obtain runtime behavior of the application based on execution context collected via one or more operating system hook points during execution of the application;

encode the data in payloads of packets of the data flow, and encoding, in the data flow, dynamic metadata derived from the observations of the application, generated by the eBPF during execution, such that the dynamic metadata represents the observations and is encoded into one or more headers of the packets of the data flow; and signal instructions to transmit the data flow via the network to the destination.

* * * * *